(12) United States Patent
Ayre et al.

(10) Patent No.: US 12,460,219 B2
(45) Date of Patent: Nov. 4, 2025

(54) METHODS AND SYSTEMS FOR TARGETED MODIFICATION OF PLANT GENES VIA MERISTEM MODULATION AND PLANTS HAVING ENGINEERED MERISTEM MODIFICATIONS AND OTHER MUTATIONS

(71) Applicant: UNIVERSITY OF NORTH TEXAS, Denton, TX (US)

(72) Inventors: Brian G. Ayre, Denton, TX (US); Roisin Carrie McGarry, Denton, TX (US)

(73) Assignee: UNIVERSITY OF NORTH TEXAS, Denton, TX (US)

( * ) Notice: Subject to any disclaimer, the term of this patent is extended or adjusted under 35 U.S.C. 154(b) by 0 days.

(21) Appl. No.: 17/749,560

(22) Filed: May 20, 2022

(65) Prior Publication Data
US 2022/0372503 A1    Nov. 24, 2022

Related U.S. Application Data

(60) Provisional application No. 63/191,072, filed on May 20, 2021.

(51) Int. Cl.
*C12N 15/82* (2006.01)

(52) U.S. Cl.
CPC ..... *C12N 15/8218* (2013.01); *C12N 15/8262* (2013.01)

(58) Field of Classification Search
None
See application file for complete search history.

(56) References Cited

PUBLICATIONS

McGarry et al., Monopodial and sympodial branching architecture in cotton is differentially regulated by the Gossypium hirsutum Single Flower Truss and Self-Pruning orthologs 2016, New Phytologist, 212: 244-258 (Year: 2016).*
Rossner et al VIGS Goes Viral: How VIGS Transforms Our Understanding of Plant Science 2022, Annual Review of Biology 73: 703-728 (Year: 2022).*
McGarry et al Altered expression of Self-Pruning disrupts homeostasis and facilitates signal delivery to meristems 2023, Plant Physiology pp. 1-15 (Year: 2023).*
Lemmon et al, Rapid improvement of domestication traits in an orphan crop by genome editing 2018, Nature Plants 4:766-770 (Year: 2018).*
Gao et al, 2019, Rescue of a plant cytorhabdovirus as versatile expression platforms for planthopper and cereal genomic studies New Phytologist 223: 2120-2133. (Year: 2019).*
Knauer et al, A high-resolution gene expression atlas links dedicated meristem genes to key architectural traits 2019, Genome Research 29: 1962-1973 (Year: 2019).*

McGarry et al, Cotton Centroradialis/Terminal Flower 1/Self-Pruning genes functionally diverged to differentially impact plant architecture 2018, Journal of Experimental Biology 69: 5403-5417 (Year: 2018).*
Guo et al, 2004, Protein tolerance to random amino acid change, Proceedings of the National Academy of Sciences, 101:9205-9210 (Year: 2004).*
Gh_D07G1075 (2015, Gossypium hirsutum (AD1) 'TM-1' genome NAU-NBI_v1.1_a1.1). (Year: 2015).*
Gohir.A07G109700 cottongen.org/bio_data/5882635; retrieved Mar. 8, 2024 (Year: 2024).*
Gohir.D07G113500 cottongen.org/bio_data/3212780; retrieved Mar. 8, 2024 (Year: 2024).*
Phytozome Blast Coker, phytozome-next.jgi.doe.gov/, retrieved Mar. 8, 2024 (Year: 2024).*
NCBI Blast Seq ID No. 1, retrieved Mar. 8, 2024 (Year: 2024).*
McGarry et al (2016, New Phytologist, 212: 244-258) (Year: 2016).*
Grant proposal dated Apr. 23, 2020.
Ayre BG, El-Gebaly FE, McGarry RC, "Virus induced flowering—a tool for cereals" Journal of Experimental Botany, 2020, 71:2839-2841. doi.org/10.1093/jxb/eraa153.
Bommert P, Nagasawa NS, Jackson D. 2013, "Quantitative variation in maize kernel row number is controlled by the Fasciated Ear2 locus", Nature Genetics, 45(3): 334-337.
Chu Y-H, Jang J-C, Huang Z, van der Knaap E., "Tomato locule number and fruit size controlled by natural alleles of lc and fas", Plant Direct, 2019, 3(7): e00142.
Fan C, Wu Y, Yang Q, Yang Y, Meng Q, Zhang K, Li J, Wang J, Zhou Y., "A Novel Single-Nucleotide Mutation in a Clavata3 Gene Homolog Controls a Multilocular Silique Trait in *Brassica rapa* L.", Molecular Plant, 2014, 7(12): 1788-1792.
Fletcher JC, "Recent advances in *Arabidopsis* CLE peptide signaling", Trends Plant Sci, 2020, 25(10): 1005-1016.
Je BI, Gruel J, Lee YK, Bommert P, Arevalo ED, Eveland AL, Wu Q, Goldshmidt A, Meeley R, Bartlett M, et al., "Signaling from maize organ primordia via Fasciated Ear3 regulates stem cell proliferation and yield traits", Nature Genetics, 2016, 48(7): 785-791; Supplemental online methods.
Liu L, Gallagher J, Arevalo ED, Chen R, Skopelitis T, Wu Q, Bartlett M, Jackson D., "Enhancing grain-yield-related traits by CRISPR-Cas9 promoter editing of maize CLE genes", Nature Plants, 2021, 7(3): 287-294.
Liu X, Kim YJ, Müller R, Yumul RE, Liu C, Pan Y, Cao X, Goodrich J, Chen X., "Agamous terminates floral stem cell maintenance in *Arabidopsis* by directly repressing Wuschel through recruitment of Polycomb Group proteins", Plant Cell, 2011, 23(10): 3654-3670.

(Continued)

*Primary Examiner* — Brent T Page
*Assistant Examiner* — Aleksandar Radosavljevic
(74) *Attorney, Agent, or Firm* — Thomas| Horstemeyer, LLP

(57) ABSTRACT

The present disclosure includes methods of producing genetically modified plants with a detectable new phenotype via combined silencing of a meristem maintenance gene and genetic manipulation of a second gene. Also included are genetically modified plants having engineered genetic modifications including a silenced meristem maintenance gene and a genetic modification of a second gene and systems for co-modifying meristem maintenance and other genes in a plant.

11 Claims, 10 Drawing Sheets

Specification includes a Sequence Listing.

(56) References Cited

PUBLICATIONS

McGarry R, Rao X, Li Q, van der Knaap E, Ayre B., "Single Flower Truss and Self-Pruning signal developmental and metabolic networks to guide cotton architectures", J Exp Bot, 2020, 71(19): DOI: 10.1093/jxb/eraa1338.

McGarry RC, Ayre BG, "Geminivirus-mediated delivery of florigen promotes determinate growth in aerial organs and uncouples flowering from photoperiod in cotton", PLoS One, 2012, 7(5): e36746.

McGarry RC, Ayre BG, "Cotton architecture: examining the roles of Single Flower Truss and Self-Pruning in regulating growth habits of a woody perennial crop", Curr Opin Plant Biol, 2021, 59: 101968.

McGarry RC, Prewitt SF, Culpepper S, Eshed Y, Lifschitz E, Ayre BG, "Monopodial and sympodial branching architecture in cotton is differentially regulated by the Gossypium hirsutum Single Flower Truss and Self-Pruning orthologs", New Phytol, 2016, 212: 244-258.

Pautler M, Eveland AL, LaRue T, Yang F, Weeks R, Lunde C, Je BI, Meeley R, Komatsu M, Vollbrecht E, et al., "Fasciated EAR4 encodes a bZIP transcription factor that regulates shoot meristem size in maize", Plant Cell, 2015, 27(1): 104-120.

Prewitt SF, Ayre BG, McGarry RC, "Cotton Centroradialis/Terminal Flower 1/Self-Pruning genes functionally diverged to differentially impact plant architecture", Journal of Experimental Botany, 2018, 69(22): 5403-5417.

Rodriguez-Leal D, Lemmon ZH, Man J, Bartlett ME, Lippman ZB, "Engineering quantitative trait variation for crop improvement by genome editing", Cell, 2017, 171(2): 470-480.e478.

Rodriguez-Leal D, Xu C, Kwon C-T, Soyars C, Demesa-Arevalo E, Man J, Liu L, Lemmon ZH, Jones DS, Van Eck J, et al., "Evolution of buffering in a genetic circuit controlling plant stem cell proliferation", Nat Genet, 2019, 51(5): 786-792.

Schlegel J, Denay G, Wink R, Pinto KG, Stahl Y, Schmid J, Blümke P, Simon RGW, "Control of *Arabidopsis* shoot stem cell homeostasis by two antagonistic CLE peptide signalling pathways", eLife, 2021, 10: e70934.

Tal L, Friedlander G, Gilboa NS, Unger T, Gilad S, Eshed Y, "Coordination of Meristem Doming and the Floral Transition by Late Termination, a Kelch Repeat Protein", Plant Cell, 2017, 29(4): 681-696.

Tuttle JR, Idris AM, Brown JK, Haigler CH, Robertson D, "Geminivirus-mediated gene silencing from Cotton leaf crumple virus is enhanced by low temperature in cotton", Plant Physiol, 2008, 148(1): 41-50.

Wang X, Aguirre L, Rodriguez-Leal D, Hendelman A, Benoit M, Lippman ZB, "Dissecting cis-regulatory control of quantitative trait variation in a plant stem cell circuit", Nature Plants, 2021, 7(4): 419-427.

Wu H, Qu X, Dong Z, Luo L, Shao C, Former J, Lohmann JU, Su M, Xu M, Liu X, et al., "Wuschel triggers innate antiviral immunity in plant stem cells", Science, 2020, 370(6513): 227-231.

Yang Y, Zhu K, Li H, Han S, Meng Q, Khan SU, Fan C, Xie K, Zhou Y, "Precise editing of Clavata genes in *Brassica hapus* L. regulates multilocular silique development", Plant Biotech J, 2018, 16(7): 1322-1335.

Zhang F, Wang Y, Irish VF, "Centroradialis maintains shoot meristem indeterminacy by antagonizing Thorn Identity1 in Citrus", Curr Biol, 2021, 31(10): 2237-2242.e2234.

Ellison, E.E., Nagalakshmi, U., Gamo, M.E., Huang, P.-j., Dinesh-Kumar, S. and Voytas, D.F., "Multiplexed heritable gene editing using RNA viruses and mobile single guide RNAs", Nat. Plants, 2020, 6, 620-624.

Goretti, D., Silvestre, M., Collani, S., Langenecker, T., Méndez, C., Madueño, F. and Schmid, M., "Terminal Flower1 functions as a mobile transcriptional cofactor in the shoot apical meristem", Plant Physiol, 2020, 182, 2081-2095.

The SGN VIGS Tool: User-Friendly Software to Design Virus-Induced Gene Silencing (VIGS) Constructs for Functional Genomics, Molecular Plant 8, 486-488, Mar. 2015.

\* cited by examiner

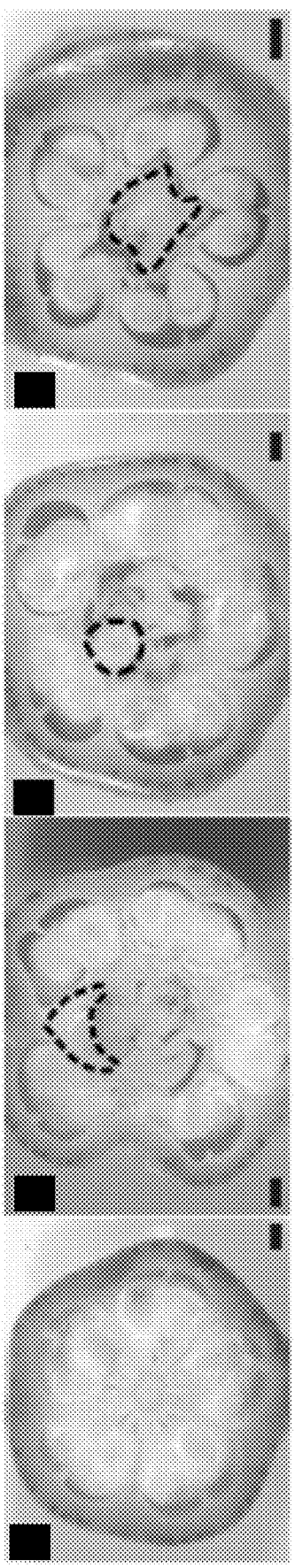
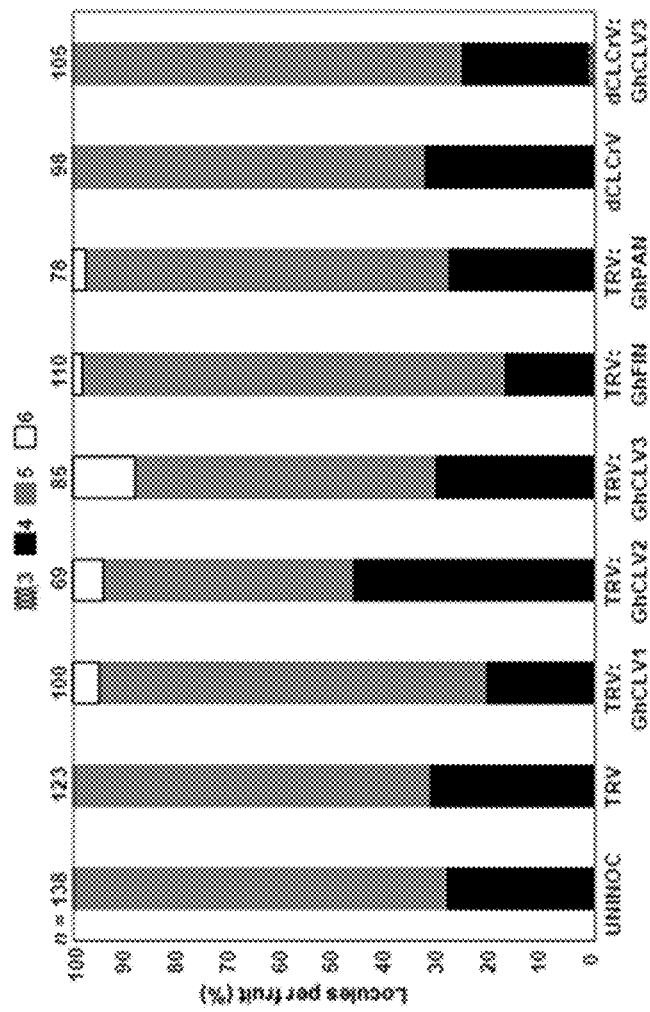
FIG. 2A   FIG. 2B   FIG. 2C   FIG. 2D
FIG. 2E

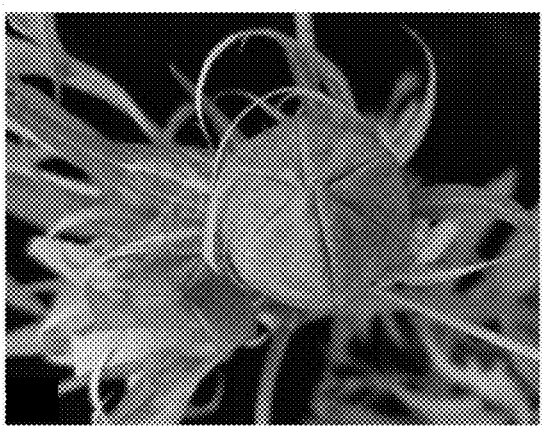
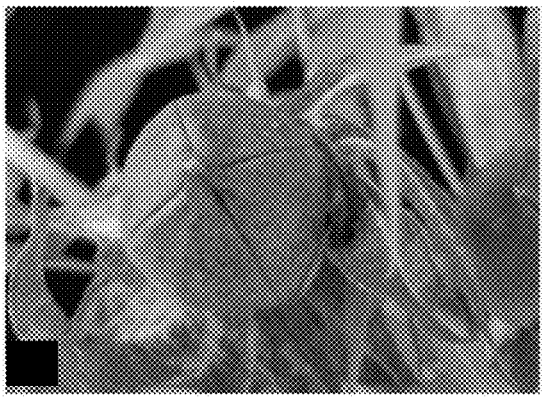
FIG. 5A  FIG. 5B  FIG. 5C  FIG. 5D  FIG. 5E

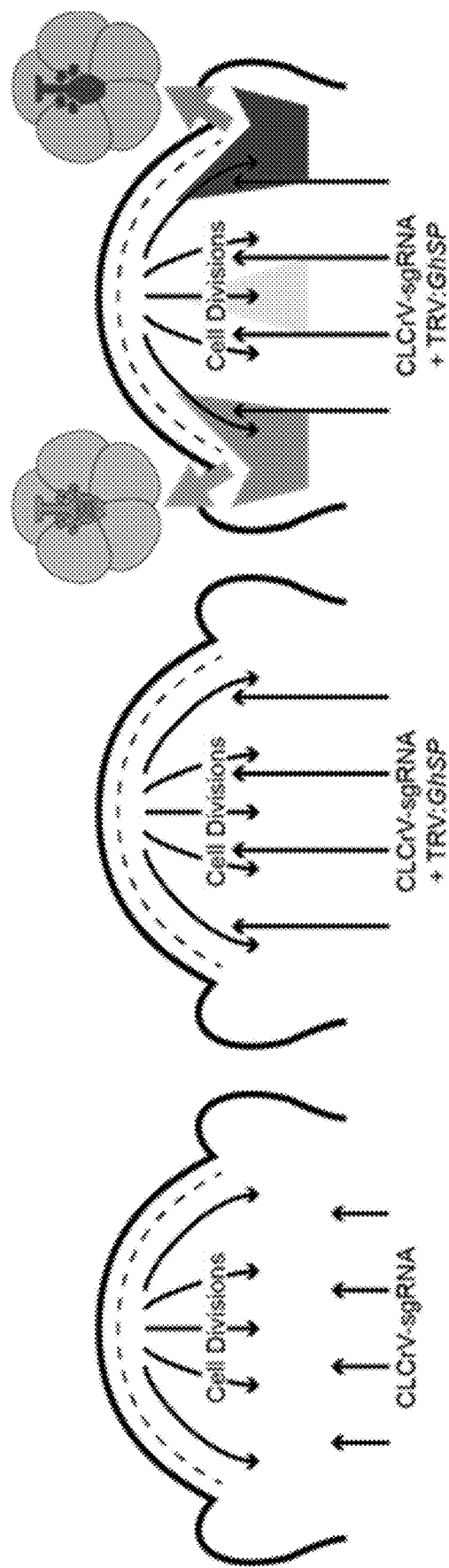

METHODS AND SYSTEMS FOR TARGETED MODIFICATION OF PLANT GENES VIA MERISTEM MODULATION AND PLANTS HAVING ENGINEERED MERISTEM MODIFICATIONS AND OTHER MUTATIONS

CROSS-REFERENCE TO RELATED APPLICATIONS

This application claims priority to U.S. provisional application titled "Methods and Systems for Targeted Modification of Plant Meristem Genes and Plants Having Engineered Meristem Modifications," having Ser. No. 63/191,072, filed on Mar. 20, 2021, which is entirely incorporated herein by reference.

SEQUENCE LISTING

This application contains a sequence listing filed in electronic form as an ASCII.txt file entitled 921402-1100_ST25.txt, created on Mar. 20, 2022, and having a size of 4 KB. The content of the sequence listing is incorporated herein in its entirety.

BACKGROUND

Meristems, small, self-replenishing pools of dividing cells, give rise to the plant body, specifying aspects such as, but not limited to, the position of branches, shape of leaves, time to flower, and distribution of flowers. These traits, in turn, affect not just individual plant phenotypes, but also impact overall crop productivity and influence yield. Like stem cells, essentially all aspects of plant development and productivity initiate with cell divisions in meristems, followed by cellular differentiation giving rise to the tissues and organs. Thus, the ability to manipulate events in meristems provides control over growth and development in all subsequent plant parts. Meristems, however, have poorly understood defenses that prevent or greatly limit access by foreign nucleic acids and/or related signals that may alter meristem function.

Great interest exists in developing efficient methods for targeted genetic modification of important crops, such as fiber crops, including cotton. Pests, disease, and problems with plant development always pose a challenge for any crop plant and undermine productivity and reduce market values. Thus, farmers and researchers seek new approaches to enhance resistance to insect pests, fungal pathogens, and other environmental threats without compromising yield and to improve plant growth and development. Gene editing has been explored as an approach to engineer heritable traits such as pest resistance, pathogen resistance, modified growth and/or development, and the like.

Genome editing in plants typically relies upon introducing RNA and Cas endonucleases to a single cell that can then be propagated to generate a whole plant. This approach has become a versatile and common technique in plants, such as tomato, that are amenable to transformation and tissue culture. Some crop plants, like cotton, however, are recalcitrant to transformation and regeneration, rendering genome editing by traditional methods and tissue culture inefficient, time consuming, and labor intensive. Editing genes in plant meristem cells can give rise to edited germline cells in flowers and, ultimately, edited seed to produce new modified plants without the requirement for lengthy tissue culture. However, meristems are resistant to genetic manipulation, including manipulation by RNA based approaches, such as virus induced gene editing techniques. The inefficiency of traditional tissue culture approaches and the resistance of meristems to genetic alteration provides a challenge to stably incorporate targeted modifications to genes in crop plants such as cotton.

SUMMARY

Briefly described, the present disclosure provides methods of producing genetically modified plants with a detectable new phenotype via combined silencing of a meristem maintenance gene and genetic manipulation of a second gene. Also provided are genetically modified plants having engineered genetic modifications including a silenced meristem maintenance gene and a genetic modification of a second gene. The present disclosure also includes systems for co-modifying meristem maintenance and other genes in a plant.

Embodiments of methods of the present disclosure for producing a genetically modified plant include at least the steps of silencing a meristem maintenance gene in the plant to induce a phase change in the plant meristem from an indeterminate to a determinate state, and genetically manipulating a second gene in the plant, wherein genetic manipulation of the second gene in combination with silencing the meristem maintenance gene results in a detectable new phenotype in the genetically modified plant. In such methods, the new phenotype is distinguishable from a phenotype resulting from either silencing the meristem maintenance gene only or mutation of the meristem gene only.

According to other aspects of the present disclosure, genetically modified plants are provided including plants made by the methods of the present disclosure. In embodiments, genetically modified plants of the present disclosure include a first engineered genetic modification that includes a silenced meristem maintenance gene, and a second engineered genetic modification comprising a mutation of a second gene such that the genetically modified plant has a distinguishable phenotype. The silencing of the in the meristem maintenance gene modulates phase change in the plant meristem from an indeterminate to a determinate state such that silencing the meristem maintenance gene induces a phase change in the plant meristem from an indeterminate to a determinate state. The new phenotype of the genetically modified plant is distinguishable from a corresponding wild type plant, a corresponding plant with only the first engineered genetic modification, and a corresponding plant with only the second engineered genetic modification The present disclosure also provides systems for modifying meristem genes in a plant. In embodiments, the system includes one or more viral vectors, where the vectors include an siRNA targeting a meristem maintenance gene that modulates phase change in a plant meristem from an indeterminate to a determinate state, such that the siRNA silences the meristem maintenance gene. The vectors also include one or more engineered RNA sequences, RNA-based signals, or a combination thereof, configured to modify a second gene in a plant.

Other systems, methods, features, and advantages of the present disclosure will be or will become apparent to one with skill in the art upon examination of the following drawings and detailed description. It is intended that all such additional systems, methods, features, and advantages be included within this description, and be within the scope of the present disclosure

BRIEF DESCRIPTION OF THE DRAWINGS

Further aspects of the present disclosure will be more readily appreciated upon review of the detailed description of its various embodiments, described below, when taken in conjunction with the accompanying drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2A-2D illustrate that altering expression of genes from the CLV-WUS circuit modestly fasciates flowers and fruits. FIG. 2A shows a transverse section of a maturing boll from an uninoculated control plant reveals five evenly distributed locules with clear septa extending from the tightly organized central columella. FIGS. 2B-2D are images of TRV:GhCLV3-silenced plants. Some bolls had an extra locule positioned closer to the center of the fruit (FIG. 2B), ectopic ovules forming outside the septum (FIG. 2C), or a loosely organized and expanded columella with ovules (FIG. 2D). FIG. 2E is a graph illustrating distribution of locule number per fruit is quantified across treatments. All flowers and fruits were harvested from virus-infected plants and controls. The total number of flowers and fruits analyzed from three replicate plants per treatment is indicated by n. The number of locules present per fruit is indicated by color: black lattice indicates the percent of all flowers and fruit with three locules; solid black indicates the percentage with four locules; solid gray indicates the percent flowers and fruit with five locules; and white represents the percent of flowers and fruit with six locules. The designation of six locules was used for fruits like those shown in FIGS. 2B-D, with an extra locule in the fruit wall and/or an expanded columella harboring ovules. Scale bars in FIGS. 2A-2D are 1 mm.

FIG. 3B shows a flower from a TRV:GhSP-GhPAN-infected plant having more than 11 petals. FIGS. 3C-3E illustrate that a flower from a TRV:GhSP-GhFIN-infected plant shows supernumerary organs: more than ten fused stigmas emerge above the sheath of stamens (FIG. 3C); removing the stamens reveals the fused styles and stigmas (FIG. 3D); and a cross-section through the ovary of this flower shows a dramatic increase in the number of locules (FIG. 3E; compare with FIG. 2A). FIGS. 3F-3H show that TRV:GhSP-GhCLV2-infected Coker 312 plants produced terminal flowers with extended and unfused styles (FIG. 3F); fasciated stamen and nested ovaries can be observed (FIG. 3G); and cross-section through this fruit reveals a whorled arrangement of multiple locules (FIG. 3H). Scale bars are 1 mm.

FIGS. 4A-4F are images illustrating that co-silencing AGAMOUS with GhSP enhances floral phenotypes. In FIG. 4A, flowers from uninoculated cotton plants show the characteristic arrangement, consisting of five petals, and a sheath of stamens surrounding the fused styles with four to five fused stigmas emerging from the center. Similar flowers are observed among (FIG. 4B) TRV-, (FIG. 4C) TRV:GhSP-, and (FIG. 4D) TRV:GhAG-infected plants. In FIGS. 4E-4F TRV:GhSP-GhAG-infected plants show flowers with an outer whorl of five petals surrounding an inner whorl of petals. The androecium and gynoecium are not evident.

FIGS. 5A-5E are images illustrating that co-silencing GhSP with GhAGAMOUS affects floral development in wild and photoperiodic variety of cotton. In FIG. 5A TRV:GhSP-infected Texas 701 terminate and produce flowers from all axillary buds. These induced flowers have five petals, with the characteristic magenta petal spot at the base of each, and are fertile and produce bolls. FIG. 5B illustrates that a TRV:GhSPGhFIN-infected plant produces a flower with ~11 petals and two or three separate and fused styles and stigmas. FIG. 5C shows a flower from a TRV:GhSP-GhCLV3-infected plant with six petals. In FIG. 5D a boll from a TRV:GhSP-silenced plant has four locules, evident from the four septa on the outer fruit wall. In contrast, a boll from a TRV:GhSP-GhFIN-silenced Texas 701 plant (FIG. 5E) has six locules while an adjacent boll has only three.

FIGS. 6A-6C show a schematic illustration of GhSP silencing and conversion of indeterminate meristems to determinate meristems to "open" the meristems, making them more susceptible to virus-based manipulation. FIG. 6A illustrates that virus-based tools have limited access to indeterminate meristem. With TRV-GhSP, the determinate meristem is more susceptible to other virus-based tools (FIG. 6B), such as those carrying guide RNAs (sgRNA). In FIG. 6C, in one example of modification according to methods of the present disclosure, CRISPR-Cas editing among dividing cells leads to edited sectors (left, middle, right) that give rise to edited pollen and ovules in flowers, leading to edited seed. Amplicon sequencing is used to identify and characterized sectors.

In FIG. 9B, the tRNA-sgRNA cassette is introduced downstream of the PEBV promoter.

DETAILED DESCRIPTION

Figure 1:
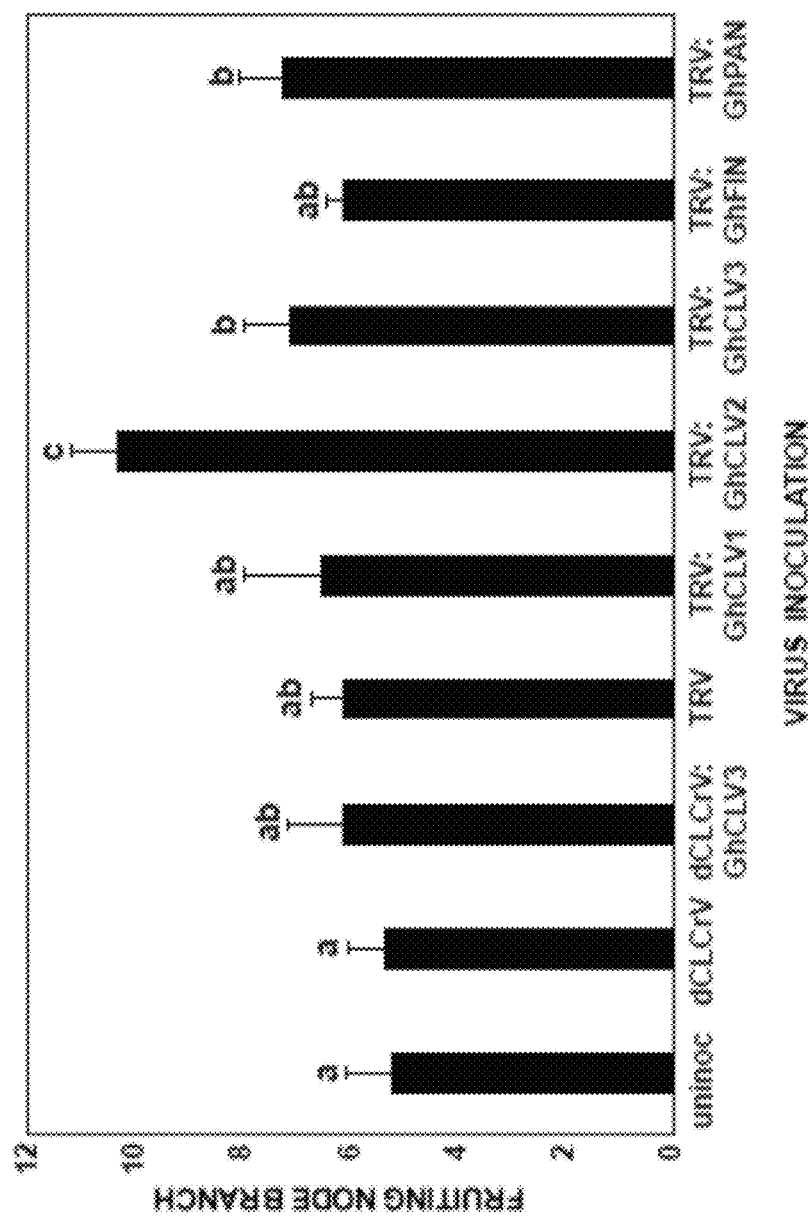
FIG. 1 is a graph illustrating that silencing GhCLAVATA2 delays the transition to reproductive growth. Meristem homeostasis genes were over-expressed from dCLCrV or silenced from TRV, and the effect of these treatments on flowering time in day-neutral Coker 312 cotton was quantified by the node of first fruiting branch. Error bars reflect the standard deviation among replicate plants per treatment (n=6). The Tukey HSD mean separation test at $p<0.05$ was used to determine significant differences among treatments, and these are indicated with lower-case letters.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of molecular biology, genetics, biochemistry, botany, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20-25° C. and 1 atmosphere.

All publications and patents cited in this specification are cited to disclose and describe the methods and/or materials in connection with which the publications are cited. Publications and patents that are incorporated by reference, where noted, are incorporated by reference as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. Any terms not specifically defined within the instant application, including terms of art, are interpreted as would be understood by one of ordinary skill in the relevant art; thus, is not intended for any such terms to be defined by a lexicographical definition in any cited art, whether or not incorporated by reference herein, including but not limited to, published patents and patent applications. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

Prior to describing the various embodiments, the following definitions are provided and should be used unless otherwise indicated.

Definitions

In describing and claiming the disclosed subject matter, the following terminology will be used in accordance with the definitions set forth below.

It must be noted that, as used in the specification and the appended claims, the singular forms "a," "an," and "the" include plural referents unless the context clearly dictates otherwise. Thus, for example, reference to "a cell" includes a plurality of cells. In this specification and in the claims that follow, reference will be made to a number of terms that shall be defined to have the following meanings unless a contrary intention is apparent.

As used herein, "about," "approximately," "substantially," and the like, when used in connection with a numerical variable, can generally refers to the value of the variable and to all values of the variable that are within the experimental error (e.g., within the 95% confidence interval for the mean) or within +/−10% of the indicated value, whichever is greater. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the following terms have the meanings ascribed to them unless specified otherwise. In this disclosure, "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. patent law and the term is open-ended, allowing for the presence of more than that which is recited so long as basic or novel characteristics of that which is recited is not changed by the presence of more than that which is recited, but excludes prior art embodiments.

As used herein with reference to the relationship between DNA, cDNA, mRNA, RNA, protein/peptides, and the like "corresponding to" or "encoding" (used interchangeably herein) refers to the underlying biological relationship between these different molecules. As such, one of skill in the art would understand that operatively "corresponding to" can direct them to determine the possible underlying and/or resulting sequences of other molecules given the sequence of any other molecule which has a similar biological relationship with these molecules. For example, from a DNA sequence an RNA sequence can be determined and from an RNA sequence a cDNA sequence can be determined.

As used herein, "deoxyribonucleic acid (DNA)" and "ribonucleic acid (RNA)" can generally refer to any polyribonucleotide or polydeoxribonucleotide, which may be unmodified RNA or DNA or modified RNA or DNA. RNA can be in the form of non-coding RNA such as tRNA (transfer RNA), snRNA (small nuclear RNA), rRNA (ribosomal RNA), anti-sense RNA, RNAi (RNA interference construct), siRNA (short interfering RNA), microRNA (miRNA), or ribozymes, aptamers, guide RNA (gRNA) or coding mRNA (messenger RNA).

As used herein, "DNA molecule" can include nucleic acids/polynucleotides that are made of DNA.

As used herein, the term "encode" refers to principle that DNA can be transcribed into RNA, which can then be translated into amino acid sequences that can form proteins.

As used herein, "expression" refers to the process by which polynucleotides are transcribed into RNA transcripts. In the context of mRNA and other translated RNA species, "expression" also refers to the process or processes by which the transcribed RNA is subsequently translated into peptides, polypeptides, or proteins. In some instances, "expression" can also be a reflection of the stability of a given RNA. For example, when one measures RNA, depending on the method of detection and/or quantification of the RNA as well as other techniques used in conjunction with RNA detection and/or quantification, it can be that increased/decreased RNA transcript levels are the result of increased/decreased transcription and/or increased/decreased stability and/or degradation of the RNA transcript. One of ordinary skill in the art will appreciate these techniques and the relation "expression" in these various contexts to the underlying biological mechanisms.

As used herein, "gene" can refer to a hereditary unit corresponding to a sequence of DNA that occupies a specific location on a chromosome and that contains the genetic instruction for a characteristic(s) or trait(s) in an organism. The term gene can refer to translated and/or untranslated regions of a genome. "Gene" can refer to the specific sequence of DNA that is transcribed into an RNA transcript that can be translated into a polypeptide or be a catalytic RNA molecule, including but not limited to, tRNA, siRNA, piRNA, miRNA, long-non-coding RNA and shRNA.

As used herein, "identity," can refer to a relationship between two or more nucleotide or polypeptide sequences, as determined by comparing the sequences. In the art, "identity" can also refer to the degree of sequence relatedness between nucleotide or polypeptide sequences as determined by the match between strings of such sequences. "Identity" can be readily calculated by known methods, including, but not limited to, those described in (Computational Molecular Biology, Lesk, A. M., Ed., Oxford University Press, New York, 1988; Biocomputing: Informatics and Genome Projects, Smith, D. W., Ed., Academic Press, New York, 1993; Computer Analysis of Sequence Data, Part I, Griffin, A. M., and Griffin, H. G., Eds., Humana Press, New Jersey, 1994; Sequence Analysis in Molecular Biology, von Heinje, G., Academic Press, 1987; and Sequence Analysis Primer, Gribskov, M. and Devereux, J., Eds., M Stockton Press, New York, 1991; and Carillo, H., and Lipman, D., SIAM J. Applied Math. 1988, 48: 1073. Preferred methods to determine identity are designed to give the largest match between the sequences tested. Methods to determine identity are codified in publicly available computer programs. The percent identity between two sequences can be determined by using analysis software (e.g., Sequence Analysis Software Package of the Genetics Computer Group, Madison Wis.) that incorporates the Needelman and Wunsch, (J. Mol.

Biol., 1970, 48: 443-453,) algorithm (e.g., NBLAST, and XBLAST). The default parameters are used to determine the identity for the polypeptides of the present disclosure, unless stated otherwise.

As used herein, "nucleic acid," "nucleotide sequence," and "polynucleotide" can be used interchangeably herein and can generally refer to a string of at least two base-sugar-phosphate combinations and refers to, among others, single- and double-stranded DNA, DNA that is a mixture of single- and double-stranded regions, single- and double-stranded RNA, and RNA that is mixture of single- and double-stranded regions, hybrid molecules comprising DNA and RNA that may be single-stranded or, more typically, double-stranded or a mixture of single- and double-stranded regions. In addition, polynucleotide as used herein can refer to triple-stranded regions comprising RNA or DNA or both RNA and DNA. The strands in such regions can be from the same molecule or from different molecules. The regions may include all of one or more of the molecules, but more typically involve only a region of some of the molecules. One of the molecules of a triple-helical region often is an oligonucleotide. "Polynucleotide" and "nucleic acids" also encompasses such chemically, enzymatically or metabolically modified forms of polynucleotides, as well as the chemical forms of DNA and RNA characteristic of viruses and cells, including simple and complex cells, inter alia. For instance, the term polynucleotide as used herein can include DNAs or RNAs as described herein that contain one or more modified bases. Thus, DNAs or RNAs including unusual bases, such as inosine, or modified bases, such as tritylated bases, to name just two examples, are polynucleotides as the term is used herein. "Polynucleotide", "nucleotide sequences" and "nucleic acids" also includes PNAs (peptide nucleic acids), phosphorothioates, and other variants of the phosphate backbone of native nucleic acids. Natural nucleic acids have a phosphate backbone, artificial nucleic acids can contain other types of backbones, but contain the same bases. Thus, DNAs or RNAs with backbones modified for stability or for other reasons are "nucleic acids" or "polynucleotides" as that term is intended herein. As used herein, "nucleic acid sequence" and "oligonucleotide" also encompasses a nucleic acid and polynucleotide as defined elsewhere herein.

As used herein, "operatively linked" in the context of recombinant DNA molecules, vectors, and the like refers to the regulatory and other sequences useful for expression, stabilization, replication, and the like of the coding and transcribed non-coding sequences of a nucleic acid that are placed in the nucleic acid molecule in the appropriate positions relative to the coding sequence so as to effect expression or other characteristic of the coding sequence or transcribed non-coding sequence. This same term can be applied to the arrangement of coding sequences, non-coding and/or transcription control elements (e.g. promoters, enhancers, and termination elements), and/or selectable markers in an expression vector. "Operatively linked" can also refer to an indirect attachment (i.e. not a direct fusion) of two or more polynucleotide sequences or polypeptides to each other via a linking molecule (also referred to herein as a linker).

As used herein, "organism", "host", and "subject" refers to any living entity comprised of at least one cell. A living organism can be as simple as, for example, a single isolated eukaryotic cell or cultured cell or cell line, or as complex as a mammal, including a human being, and animals (e.g., vertebrates, amphibians, fish, mammals, e.g., cats, dogs, horses, pigs, cows, sheep, rodents, rabbits, squirrels, bears, primates (e.g., chimpanzees, gorillas, and humans). These terms also contemplate plants, fungi, bacteria, etc.

As used herein, the terms "optional" or "optionally" means that the subsequently described event or circumstance may or may not occur, and that the description includes instances where said event or circumstance occurs and instances where it does not.

As used herein, "polypeptides" or "proteins" refers to amino acid residue sequences. Those sequences are written left to right in the direction from the amino to the carboxy terminus. In accordance with standard nomenclature, amino acid residue sequences are denominated by either a three letter or a single letter code as indicated as follows: Alanine (Ala, A), Arginine (Arg, R), Asparagine (Asn, N), Aspartic Acid (Asp, D), Cysteine (Cys, C), Glutamine (Gln, Q), Glutamic Acid (Glu, E), Glycine (Gly, G), Histidine (His, H), Isoleucine (lie, I), Leucine (Leu, L), Lysine (Lys, K), Methionine (Met, M), Phenylalanine (Phe, F), Proline (Pro, P), Serine (Ser, S), Threonine (Thr, T), Tryptophan (Trp, W), Tyrosine (Tyr, Y), and Valine (Val, V). "Protein" and "Polypeptide" can refer to a molecule composed of one or more chains of amino acids in a specific order. The term protein is used interchangeable with "polypeptide." The order is determined by the base sequence of nucleotides in the gene coding for the protein. Proteins can be required for the structure, function, and regulation of the body's cells, tissues, and organs.

As used herein, "promoter" includes all sequences capable of promoting or otherwise modulating transcription of a coding or a non-coding sequence. In particular, the term "promoter" as used herein refers to a nucleotide sequence generally, but not always, described as the 5' regulator region of a gene, located proximal to the start codon, but can also include additional sequences influencing transcript of the gene. The transcription of an adjacent coding sequence (s) is initiated at the promoter region. The term "promoter" also includes fragments of a promoter that are functional in initiating transcription of the gene.

As used herein, the term "recombinant" or "engineered" can generally refer to a non-naturally occurring nucleic acid, nucleic acid construct, or polypeptide. Such non-naturally occurring nucleic acids may include natural nucleic acids that have been modified, for example that have deletions, substitutions, inversions, insertions, etc., and/or combinations of nucleic acid sequences of different origin that are joined using molecular biology technologies (e.g., a nucleic acid sequences encoding a fusion protein (e.g., a protein or polypeptide formed from the combination of two or more different proteins or protein fragments), the combination of a nucleic acid encoding a polypeptide to heterologous sequence (e.g., a regulatory sequence such as, but not limited to, a promoter sequence, where the coding sequence and heterologous sequence are from different sources or otherwise do not typically occur together naturally, such as a nucleic acid and a constitutive promoter), etc. Recombinant or engineered can also refer to the polypeptide encoded by the recombinant nucleic acid. Non-naturally occurring nucleic acids or polypeptides include nucleic acids and polypeptides modified by man.

As used herein, "selectable marker" refers to a gene whose expression allows one to identify cells that have been transformed or transfected with a vector containing the marker gene. For instance, a recombinant nucleic acid may include a selectable marker operatively linked to a gene of interest and a promoter, such that expression of the selectable marker indicates the successful transformation of the cell with the gene of interest.

A "suitable control" is a control that will be appreciated by one of ordinary skill in the art as one that is included such that it can be determined if the variable being evaluated has an effect, such as a desired effect or hypothesized effect. One of ordinary skill in the art will also appreciate based on inter alia, the context, the variable(s), the desired or hypothesized effect, what is a suitable or an appropriate control needed.

As used herein, "transforming" (also "transformation" or "transformed") when used in the context of engineering or modifying a cell, refers to the introduction by any suitable technique and/or the transient or stable incorporation and/or expression of an exogenous nucleic acid (e.g., DNA or RNA) in a cell in such a way as to allow expression of the coding portions of the introduced nucleic acid.

As used herein, the term "transfection" refers to the introduction of an exogenous and/or recombinant nucleic acid sequence into the interior of a membrane enclosed space of a living cell, including introduction of the nucleic acid sequence into the cytosol of a cell as well as the interior space of a mitochondria, nucleus, or chloroplast. The nucleic acid may be in the form of naked DNA or RNA, it may be associated with various proteins or regulatory elements (e.g., a promoter and/or signal element), or the nucleic acid may be incorporated into a vector or a chromosome. A "transformed" cell is thus a cell transfected with a nucleic acid sequence. The term "transformation" refers to the introduction of a nucleic acid (e.g., DNA or RNA) into cells in such a way as to allow expression of the coding portions of the introduced nucleic acid.

As used herein a "transformed cell" is a cell transfected with a nucleic acid sequence. As used herein, a "transgene" refers to an artificial gene or portion thereof that is used to transform a cell of an organism, such as a bacterium or a plant.

As used herein, "variant" can refer to a polynucleotide or polypeptide that differs from a reference polynucleotide or polypeptide but retains essential and/or characteristic properties (structural and/or functional) of the reference polynucleotide or polypeptide. A typical variant of a polypeptide differs in amino acid sequence from another, reference polypeptide. The differences can be limited so that the sequences of the reference polypeptide and the variant are closely similar overall and, in many regions, identical. A variant and reference polypeptide may differ in nucleic or amino acid sequence by one or more modifications at the sequence level or post-transcriptional or post-translational modifications (e.g., substitutions, additions, deletions, methylation, glycosylations, etc.). A substituted nucleic acid may or may not be an unmodified nucleic acid of adenine, thiamine, guanine, cytosine, uracil, including any chemically, enzymatically or metabolically modified forms of these or other nucleotides. A substituted amino acid residue may or may not be one encoded by the genetic code. A variant of a polypeptide may be naturally occurring such as an allelic variant, or it may be a variant that is not known to occur naturally. "Variant" includes functional and structural variants.

As used herein, "isolated" means removed or separated from the native environment. Therefore, isolated DNA can contain both coding (exon) and noncoding regions (introns) of a nucleotide sequence corresponding to a particular gene. An isolated peptide or protein indicates the protein is separated from its natural environment. Isolated nucleotide sequences and/or proteins are not necessarily purified. For instance, an isolated nucleotide or peptide may be included in a crude cellular extract or they may be subjected to additional purification and separation steps.

With respect to nucleotides, "isolated nucleic acid" refers to a nucleic acid with a structure (a) not identical to that of any naturally occurring nucleic acid or (b) not identical to that of any fragment of a naturally occurring genomic nucleic acid spanning more than three separate genes, and includes DNA, RNA, or derivatives or variants thereof. The term covers, for example but not limited to, (a) a DNA which has the sequence of part of a naturally occurring genomic molecule but is not flanked by at least one of the coding sequences that flank that part of the molecule in the genome of the species in which it naturally occurs; (b) a nucleic acid incorporated into a vector or into the genomic nucleic acid of a prokaryote or eukaryote in a manner such that the resulting molecule is not identical to any vector or naturally occurring genomic DNA; (c) a separate molecule such as a cDNA, a genomic fragment, a fragment produced by polymerase chain reaction (PCR), ligase chain reaction (LCR) or chemical synthesis, or a restriction fragment; (d) a recombinant nucleotide sequence that is part of a hybrid gene, e.g., a gene encoding a fusion protein, and (e) a recombinant nucleotide sequence that is part of a hybrid sequence that is not naturally occurring. Isolated nucleic acid molecules of the present disclosure can include, for example, natural allelic variants as well as nucleic acid molecules modified by nucleotide deletions, insertions, inversions, or substitutions.

As used herein, the term "vector" is used in reference to a vehicle used to introduce an exogenous nucleic acid sequence into a cell. A vector may include a nucleic acid molecule (e.g., a DNA or RNA polynucleotide), linear or circular (e.g., plasmids), which includes a segment encoding a polypeptide of interest operatively linked to additional segments that provide for its transcription and translation upon introduction into a host cell or host cell organelles. Such additional segments may include promoter and terminator sequences, and may also include one or more origins of replication, one or more selectable markers, an enhancer, a polyadenylation signal, etc. Expression vectors are generally derived from yeast or bacterial genomic or plasmid DNA, or viral DNA, or may contain elements of both. In embodiments of the present disclosure, vectors are derived from viruses capable of infecting one or more plant species can be referred to herein as plant viral vectors.

As used herein, "plasmid" refers to a type of vector that includes a non-chromosomal double-stranded DNA sequence including an intact "replicon" such that the plasmid is replicated in a host cell.

As used herein, the term "expression system" includes a biologic system (e.g., a cell based system) used to express a polynucleotide to produce a protein. Such systems generally employ a plasmid or vector including the polynucleotide of interest (e.g., an exogenous nucleic acid sequence, a recombinant sequence, etc.), where the plasmid or expression vector is constructed with various elements (e.g., promoters, selectable markers, etc.) to enable expression of the protein product from the polynucleotide. Expression systems use the host system/host cell transcription and translation mechanisms to express the product protein. Common expression systems include, but are not limited to, bacterial expression systems (e.g., *E. coli*), yeast expression systems, viral expression systems, animal expression systems, and plant expression systems.

As used herein, "wild-type" is the typical form of an organism, variety, strain, gene, protein, or characteristic as it occurs in nature, as distinguished from mutant forms that may result from selective breeding or transformation with a transgene.

As used herein, "electroporation" is a transformation method in which a high concentration of plasmid DNA (containing exogenous DNA) is added to a suspension of host cell protoplasts, and the mixture shocked with an electrical field of about 200 to 600 V/cm.

As used herein, a "transgene" refers to an artificial gene which is used to transform a cell of an organism, such as a bacterium or a plant.

As used herein, the term "exogenous DNA, "Exogenous gene," "exogenous nucleic acid sequence" or "exogenous polynucleotide" refers to a nucleic acid sequence that was introduced into a cell, organism, or organelle via transfection, electroporation, infiltration, or other delivery procedure. Exogenous nucleic acids originate from an external source, for instance, the exogenous nucleic acid may be from another cell or organism and/or it may be synthetic and/or recombinant. While an exogenous nucleic acid sometimes originates from a different organism or species, it may also originate from the same species (e.g., an extra copy or recombinant form of a nucleic acid that is introduced into a cell or organism in addition to or as a replacement for the naturally occurring nucleic acid). Typically, the introduced exogenous sequence is a recombinant sequence.

As used herein, the term "over-expression" and "up-regulation" or "increasing" production of a polypeptide refers to the expression of a nucleic acid encoding a polypeptide (e.g., a gene) in a modified cell at higher levels (therefore producing an increased amount of the polypeptide encoded by the gene) as compared to a "wild type" cell (e.g., a substantially equivalent cell that is not modified in the manner of the modified cell) under substantially similar conditions.

Conversely, "under-expression" and "down-regulation" refers to expression of a polynucleotide (e.g., a gene) at lower levels (producing a decreased amount of the polypeptide encoded by the polynucleotide) than in a "wild type" cell. As with over-expression, under-expression can occur at different points in the expression pathway, such as by decreasing the number of gene copies encoding for the polypeptide; removing, interrupting, or inhibiting (e.g., decreasing or preventing) transcription and/or translation of the gene (e.g., by the use of antisense nucleotides, suppressors, knockouts, antagonists, etc.), or a combination of such approaches. "Suppression" refers to the inhibition of production and/or activity functional gene product. Thus, the suppression of a gene or protein may indicate that the expression of the gene and/or activity of the encoded peptide has been inhibited such as by transcription and/or translation being inhibited, thus resulting in low to no production of the encoded protein, or production of a non-functional product, or production of an interfering nucleic acid that otherwise suppresses activity of the target protein.

Similarly, with respect to a gene product, such as a protein, "reduced activity" indicates that the activity of the protein is reduced relative to activity in a "wild type cell". Such reduction in activity can be the result of inhibition/suppression/down-regulation/under-expression of the gene encoding the protein, the result of inhibition of translation of the messenger RNA into a functional gene product, or the result of production of a non-functional protein with reduced or no activity, or the direct suppression of the protein activity (e.g., preventing binding to a target), or the like. "Reduced production" of a gene product (e.g., a protein), such as by suppression, interruption, or other inhibition of transcription or translation, may result in reduced activity, but "reduced activity" of a protein or other gene product may result from other causes other than "reduced production", such as set for the above.

Similarly, with respect to genes or other nucleic acids, "silencing" or "deletion" of a gene may include complete deletion of the nucleic acid/gene encoding a target peptide, complete suppression of translation or transcription of the target nucleic acid such that the target peptide is not produced, but the terms may also include some of the methods for "suppression" and "down-regulation" discussed above, where the "suppression" is significant enough to reduce expression of the target gene to the extent that the resulting peptide is inactive or the activity of the resulting peptide is so minimal as to be virtually undetected.

The term "null mutation" refers to a mutation in which the gene product (e.g., the protein encoded by the gene) is either not produced (or produced at significantly reduced levels, so as to be negligible) or is non-functional. Typically, a null mutation will involve a mutation of the native gene, such that the gene is not transcribed into RNA, the RNA product cannot be translated, or the protein produced by gene expression is non-functional.

DISCUSSION

In accordance with the purpose(s) of the present disclosure, as embodied and broadly described herein, embodiments of the present disclosure, in some aspects, relate to methods for producing modified plants by modifying meristem genes in a plant to silence a meristem maintenance gene in the plant and also genetically manipulating a second gene in the plant to produce a modified plant having a new phenotype. The present disclosure also provides modified plants produced by the methods of modifying meristem and other genes of the present disclosure and systems for modifying plant genes. The present disclosure also provides genetically modified plants including a first engineered modification including a silenced meristem maintenance gene and a second engineered modification including a mutation to a second gene, seeds produced from these modified plants, and the like. Systems for modifying meristem and other genes in a plant are also provided. Some such systems provide for dual modification of a meristem gene and another gene (meristem or other somatic gene) in a plant. Embodiments of such systems include a first viral vector to silence a meristem maintenance gene and a second viral vector to modify a second gene in the plant. Embodiments of such methods, plants, and systems facilitate/provide targeted genetic modifications to plant species without the need for tissue culture.

Meristems, essentially plant stem cells, give rise to the plant body, and determine the position of branches, shape of leaves, time to flower, distribution of flowers and other traits that affect crop productivity and influence yield. Methods of the present disclosure involve targeted manipulation of meristem regulation to leverage principles of plant architecture to allow further genetic manipulation of plants to enhance yields of crops, such as cotton, and improve crop management. This can provide the ability to address current and future environmental challenges, increasing demands, and advancing agricultural technologies.

As described in greater detail in the examples below, since cotton plants are resistant to conventional genetic manipulation techniques, cotton was used as a model system for elucidating genetic pathways regulating meristem maintenance. Involving representative meristem genes, the CLAVATA (CLV)-WUSCHEL (WUS) loop was found to be involved in maintaining dividing stem cells while simultaneously promoting cell differentiation. It was shown that identification and disruption of this regulatory circuit in cotton could produce enlarged meristems and promote larger sized fruits. A robust system of virus-induced gene silencing was used to knock-out expression of cotton genes orthologous to the *Arabidopsis* and tomato CLV, WUS, and other meristem maintenance genes. In a complementary strategy, transgenic cotton lines were generated with inducible WUS expression.

Additional results in the examples below demonstrated that signals impacting meristem fate could be altered, thereby enhancing determinate architectures in plants, such as but not limited to cotton, while reducing undesirable vegetative growth. As described in Example 1, the SINGLE FLOWER TRUSS (GhSFT) gene was found to stimulate the transition to flowering and determinate growth while its closely related antagonist SELF-PRUNING (GhSP) maintains meristems in indeterminate states to favor vegetative growth. It was shown that over-expressing GhSFT while simultaneously silencing GhSP results in highly determinate and productive cotton with reduced foliage and more synchronous fruiting. Based on these findings, GhSFT, GhSP, and genes in these signaling networks were identified as promoting "annualized" growth patterns with the ability to improve cotton productivity and management. As described in the example, the gene expression networks involved in GhSFT- and GhSP-regulated architectures were examined and found to play substantial roles cotton growth.

Based on the characterization of the activities of SINGLE FLOWER TRUSS (SFT) and SELF-PRUNING (SP) in controlling patterns of determinate and indeterminate cotton growth, additional studies probed the role of GhSP with other developmental regulators, including components of the CLAVATA-WUSCHEL circuit that maintains the meristem niche. As demonstrated in Examples 1 and 2, below, when the CLAVATA-WUSCHEL genes are co-silenced with GhSP, extreme changes in floral meristem size and complexity are consistently evident.

The studies indicated that, as a meristem maintenance gene, loss of GhSP function facilitates entry of other signals to the meristems to benefit gene manipulation. Additional findings demonstrate that co-silencing GhSP in combination with other techniques for genetic modification facilitates manipulation of gene function and improves efficiency of genetic modification approaches. This appears to be the result of a combination of factors: (1) the immediate transition from vegetative to reproductive growth in GhSP silenced plants reduces the time required from initial infection to phenotype analysis from about 60 days to about 30 days or less, depending on the phenotype being assessed; (2) earlier flowering and determinate growth in these plants leads to mature seed 1-1.5 months earlier than untreated plants; (3) the phenotypes observed are stronger, more consistent, and closer to complete knock-outs; and (4) "opening" the meristem to other virus-based systemic technologies improves the ability to develop virus-based meristem and germline gene-editing technologies, such as those involving CRISPER-based gene editing. This ability to "open" the meristem via silencing of meristem maintenance genes along with additional gene manipulation provides methods of the present disclosure for modifying a plant genome, modified plants produced by such methods, and systems for producing modified plants.

Methods of Modifying Genes in a Plant Via "Opening" Meristem

Methods of the present disclosure include modifying the genome of a plant by modifying meristems of plants (and thus producing modified plants) by silencing a major meristem maintenance gene to stimulate dramatic phase change in plant meristems from vegetative growth to reproductive growth, and co-silencing or otherwise modifying one or more other genes to produce a modified plant. This method of modification can be used to alter aspects of plant development and phenotype such as, but not limited to cell fate, organ size, organ identity, and the like (e.g., larger showier flowers and larger harvestable fruits).

In embodiments, the silenced meristem maintenance gene can be, but is not limited to, SELF-PRUNING gene product and/or homologs/orthologs thereof. According to this approach, six unique meristem genes were tested, and it was demonstrated that co-silencing each with SELF-PRUNING consistently and substantially impacted plant development. It was also demonstrated that these alterations were not observed without silencing SELF-PRUNING. In addition to RNA-based signals for silencing, the present disclosure also includes improved delivery of other RNA molecules and RNA-based signals, such as aptamers, ribozymes, riboswitches, and guide sequences for CRISPR-mediated gene editing.

According to methods of the present disclosure for modifying genes in a plant, the methods include a "shock treatment" in which a meristem maintenance gene is silenced in the plant. The silencing of the meristem maintenance gene induces a phase change in the plant meristem from an indeterminate to a determinate state, which makes it more receptive to genetic manipulation. In addition to silencing of the meristem maintenance gene, the methods include also genetically manipulating a second gene in the plant to produce a new phenotype in the plant.

In embodiments of the methods of the present disclosure, the genetic manipulation of the second gene in combination with silencing the meristem maintenance gene results in a detectable phenotype distinguishable from a phenotype resulting from either silencing the meristem maintenance gene only or mutation of the meristem gene only. For instance, in some embodiments, silencing the meristem maintenance gene results in a greater percentage of modified second genes in the plant as compared to genetic manipulation of the second gene without silencing the meristem maintenance gene.

The methods of the present disclosure are applicable to a wide variety of plant species and cultivars. For purposes of illustration, in embodiments, the plant can be, but is not limited to the following: a cotton plant, a tobacco plant, other *Malvaceae* plants; *Arabidopsis*, canola and other Brassicaceae plants; tomato, potato, peppers and other Solanaceae plants; switchgrass, miscanthus, maize, rice, wheat and other Poaceae; soybean, alfalfa, and other Fabaceae plants; poplar and other wood trees; apple, peaches, citrus, and other fruit trees, among others.

Depending on the plant species, various meristem maintenance genes can be silenced to provide the "shock treatment" to render the plant more susceptible to further genetic manipulation. In some embodiments, the meristem maintenance gene is SELF-PRUNING (GhSP) from cotton or an ortholog/homolog thereof. For instance, such as illustrated in the Examples below, the meristem maintenance gene can have a polynucleotide sequence GhSP from cotton (SEQ ID NO: 1). However, the meristem maintenance gene can also include functional homologs/orthologs of GhSP from cotton that are in other cotton species or other plant species, such as a polynucleotide sequence that is about 50-100% identical to GhSP from cotton having SEQ ID NO: 1. In embodiments, the meristem maintenance gene can be an ortholog of GhSP such as, but not limited to, TERMINAL FLOWER 1, CENTRORADIALIS, and SELF PRUNING.

In the methods of the present disclosure for providing genetically modified plants, the second gene to be genetically modified/manipulated can be any gene of the plant. In some embodiments of these methods, the second gene is a second meristem gene (different from the silenced meristem maintenance gene). While this method is not limited to modification of developmental genes/phenotypes, in some example embodiments, the second gene can be selected from genes that modulate one or more aspects of plant development, selected from the group consisting of: cell fate, organ size, organ identity, fruit size, growth rate, and combinations thereof. In some embodiments, the second gene is selected from the group consisting of: CLAVATA-WUSCHEL circuit, CLAVATA1, CLAVATA2, CLAVATA3, AGAMOUS (GhAG) from cotton, FASCIATED INFLORESCENCE (FIN), PERIANTHIA, AGAMOUS, and orthologs of the foregoing. While these genes are discussed here, it is envisioned that any plant gene can be the second gene modified, in addition to the silencing of the meristem maintenance gene.

The second gene can be manipulated/modified via a variety of genetic modification techniques, such as silencing, mutation/editing, substitution, and the like. In embodiments, genetically manipulating the second gene includes co-silencing the second gene with the meristem maintenance gene. In some embodiments, manipulation of the second gene includes editing the second gene with delivery of RNA molecules and/or RNA-based signals, such as, for instance, guide RNA sequences for CRISPR-mediated gene editing, aptamers, ribozymes, and riboswitches. For instance, in some embodiments, genetically manipulating the second gene is done by genetically modifying the second gene with a CRISPR/Cas gene editing system including a CRISPR RNA guide sequence targeting the second gene. The CRISPR RNA guides sequences can include one or more CRISPR RNA guide sequences targeting the second gene and a Cas nuclease that delivered to plant cells in one or more viral vectors. The Cas nuclease can be selected from a wide variety of Cas nucleases (many are known and others are still being discovered). Examples of some possible Cas nucleases that could be used with methods of the present disclosure include, but are not limited to, Cas 9 and Cas 12a.

Various methods of genetic manipulation, gene silencing, mutation, and the like can be employed with the methods described in the present disclosure. In embodiments, silencing the meristem maintenance gene, the second gene, or both includes the use of virus induced gene silencing (VIGS). For instance, VIGS can involve infecting the plant with a viral vector comprising an siRNA targeting the meristem maintenance gene and/or the second gene to be silenced. In embodiments, the viral vector is selected from, but not limited to, the following: a Tobacco Rattle Virus (TRV, Virgaviridae) viral vector, a cotton leaf crumple virus (CLCrV, Geminiviridae) viral vector, or a Foxtail Mosaic Virus or a Potato Virus X (FoMV, PVX, Alphaflexiviridae) viral vector.

Methods of the present disclosure further include, after the above silencing of a meristem maintenance gene and manipulation of a second gene in a plant, then growing the modified plants, and identifying modified plants or plant sections with a new phenotype indicating the presence of modified genes and collecting seeds from the plants. Embodiments, further include growing the seeds to confirm retention of the new phenotype in subsequent generations.

Genetically Modified Plants with Silenced Meristem Maintenance Gene and Other Manipulated Gene(s)

In addition to the above-described methods for genetically modifying plants, the present disclosure also provides genetically modified plants, such as plants made by the above-described methods. Such plants include a first engineered genetic modification including a silenced meristem maintenance gene, where the meristem maintenance gene modulates phase change in the plant meristem from an indeterminate to a determinate state such that silencing the meristem maintenance gene induces a phase change in the plant meristem from an indeterminate to a determinate state. The genetically modified plants of the present disclosure also include a second engineered genetic modification including a mutation to a second gene, where the genetically modified plant has a phenotype distinguishable from a corresponding wild type plant a corresponding plant with only the first engineered genetic modification and a corresponding plant with only the second engineered genetic modification.

In embodiments, the engineered mutation to the second gene is selected from, but not limited to: silencing, deletion of all or a portion of a polynucleotide sequence of the second gene, modification of a portion of a polynucleotide sequence of the second gene, and replacement of the second meristem gene with an exogenous gene. In embodiments, the second gene is selected from genes that modulate one or more aspects of plant phenotype, such as, but not limited to, cell fate, organ size, organ identity, fruit size, growth rate, and combinations thereof.

Although various plant species and cultivars can be modified by methods of the present disclosure, in some embodiments, the plant is selected from the following: a cotton plant, kenaf, okra and other *Malvaceae* plants; *Arabidopsis*, canola and other Brassicaceae plants; tomato, potato, peppers, tobacco, and other Solanaceae plants; switchgrass, miscanthus, maize, rice, wheat and other Poaceae; soybean, alfalfa, and other Fabaceae plants; poplar and other wood trees; apple, peaches, citrus, and other fruit trees.

As discussed above, while various meristem maintenance genes from different species may be silenced according to the present disclosure, in some embodiments, the silenced meristem maintenance gene is SELF-PRUNING (GhSP) from cotton or a homolog (e.g., ortholog thereof or paralog thereof) in another cultivar or species. In embodiments, the silenced meristem maintenance gene has a polynucleotide sequence that is about 50-100% identical to GhSP from cotton having SEQ ID NO: 1.

The second gene can be various genes that modulate one or more aspects of plant phenotype, including phenotypes related to plant development as well as other phenotypes. Some such phenotypes, include, but are not limited to, cell fate, organ size, organ identity, fruit size, growth rate, and combinations thereof. In some embodiments, the second gene is a second meristem gene. For instance, in some non-limiting examples, the plant is cotton, the meristem maintenance gene is GhSP, and the second gene is selected from the group consisting of: CLAVATA-WUSCHEL and AGAMOUS (GhAG).

The present disclosure also provides seeds produced by the genetically modified plants of the present disclosure.

Systems for Genetic Modification of Plants Via Meristem Modulation

The present disclosure also provides systems for modifying meristem genes in a plant. In embodiments, the system includes one or more viral vectors. The one or more viral vectors can include an siRNA targeting a meristem maintenance gene that modulates phase change in a plant meristem from an indeterminate to a determinate state and engineered RNA sequences and/or RNA-based signals configured to modify a second gene in a plant.

In some embodiments, the RNA sequences and/or RNA-based signals are selected from siRNA sequences, guide RNA sequences for CRISPR-mediated gene editing, aptamers, ribozymes, and riboswitches and/or the second gene to be silenced. The engineered RNA sequences and/or RNA-based signals can induce a mutation in the second gene. In embodiments, the mutation is selected from, but not limited to, the following: silencing, deletion of all or a portion of a polynucleotide sequence of the second gene, modification of a portion of a polynucleotide sequence of the second gene, and replacement of the second gene with an exogenous gene. In embodiments, the engineered RNA sequences and/or RNA-based signal comprises an siRNA sequence that silences the second gene in the plant.

Although the silencing of the meristem maintenance gene and the genetic modification to the second gene can be produced by various methods known to those of skill in the art of genetic manipulation of plants, in some embodiments, such as those described in greater detail in the Examples below, the engineered RNA sequences and/or RNA-based signal include a CRISPR/Cas system. For instance, in a non-limiting example, a system for modifying meristem genes in a plant according to the present disclosure can include a CRISPR RNA guide sequence targeting the second gene, such that binding of the CRISPR RNA guide sequence to the second gene enables editing of the second gene with a Cas nuclease (such as, but not limited to, Cas 9 and Cas 12a).

As discussed above, while various meristem maintenance genes can be modified according to aspects of the present disclosure, in embodiments, the meristem maintenance gene is SELF-PRUNING (GhSP) from cotton or a homolog (e.g., ortholog or paralog) thereof. For instance, the meristem maintenance gene can have a polynucleotide sequence that is about 50-100% identical to GhSP from cotton having SEQ ID NO: 1

In embodiments, the second gene is also a meristem gene. For instance, the second gene can be a second meristem gene selected from, but not limited to: CLAVATA-WUSCHEL and AGAMOUS (GhAG) from cotton or orthologs thereof.

Various viral vector systems can be used according to different aspects of the present disclosure. In embodiments, the one or more viral vectors can be, but are not limited to, a Tobacco Rattle Virus (TRV) viral vector and a cotton leaf crumple (CLCrV) viral vector.

In some embodiments, the system includes one or more viral vectors. It may be advantageous to include both the gene silencing constructs and engineered RNA sequences/or RNA-based signals for modification of the second gene all in a single vector for delivery to the recipient plant. However, in some embodiments of systems of the present disclosure, the constructs may be included in two or more viral vectors. In some embodiments a first viral vector includes the siRNA targeting a meristem maintenance gene, and a second viral vector includes the engineered RNA sequences and/or RNA-based signals configured to modify a second gene in a plant. In some embodiments, the viral vector is a single vector including the RNA for silencing the meristem maintenance gene and the engineered RNA sequences or RNA-based signals to modify the second gene.

Additional details regarding the methods, plants, seeds, and systems of the present disclosure are provided in the Examples below. The specific examples below are to be construed as merely illustrative, and not limitative of the remainder of the disclosure in any way whatsoever. Without further elaboration, it is believed that one skilled in the art can, based on the description herein, utilize the present disclosure to its fullest extent.

It should be emphasized that the embodiments of the present disclosure, particularly, any "preferred" embodiments, are merely possible examples of the implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure, and protected by the following claims.

The following examples are put forth so as to provide those of ordinary skill in the art with a complete disclosure and description of how to perform the methods and use the compositions and compounds disclosed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Embodiments of the disclosure described above, and as described in Examples 1 and 2, below, include silencing the SELF-PRUNING gene product to stimulate dramatic phase change in cotton meristems from vegetative growth to reproductive growth, and co-silencing or otherwise modifying other plant genes to alter cell fate, organ size, and organ identity (i.e., we made larger showier flowers and larger harvestable fruits). In addition to SP and CLV-WUS, additional genes were tested, including CLAVATA1, CLAVATA2, CLAVATA3, AGAMOUS (GhAG), FASCIATED INFLORESCENCE (FIN), PERIANTHIA, AGAMOUS (see Table 2, below) and it was demonstrated that co-silencing each with SELF-PRUNING consistently and substantially impacted plant development and these alterations were not observed (or not observed to the same extent, degree, or frequency) without silencing SELF-PRUNING. In addition to RNA-based signals for silencing, Example 3 describes example of some embodiments of methods for delivery of other RNA molecules and RNA-based signals, such as aptamers, ribozymes, riboswitches, and guide sequences for CRISPR-mediated gene editing for carrying out the gene modifications of the methods of the present disclosure. However other methods for delivering RNA molecules/signals and for making the genetic modifications to the meristem maintenance genes and second gene are contemplated.

Example 1—Altering Meristem Fate Increases the Potency of Other Meristem-Targeted Signals Introduction Meristems depend on intercellular signals to balance stem cell proliferation with cellular differentiation. Meristem maintenance genes appear to be a gatekeeper for meristems between an indeterminate and a determinate state. Thus, this example examines manipulation of meristem maintenance genes and other meristem and non-meristem plant genes separately and in combination to compare the effect of single mutations in meristem or other genes to the effect of dual mutation of meristem maintenance gene with a secondary mutation. This Example also characterizes the effect of modulating meristem maintenance genes to open the plant genome to increase the influence of other gene mutations on plant phenotype.

In the shoot apical meristem, regulation is achieved through the highly conserved CLAVATA (CLV)-WUSCHEL (WUS) negative feedback circuit (Aichinger et al., 2012; Somssich et al., 2016). The WUS homeodomain transcription factor promotes stem cell proliferation while CLV signaling proteins prevent over-proliferation of stem cells (Clark et al., 1995; Laux et al., 1996; Clark et al., 1997; Mayer et al., 1998; Fletcher, L C et al., 1999; Schoof et al., 2000). CLV3 is secreted from stem cells and processed to a 13 amino acid glycopeptide, and diffuses to the underlying organizing center to restrict WUS expression and promote cell differentiation through binding CLV1 and CLV2 receptors. WUS promotes CLV3 expression to limit its own activity. Disruptions in CLV-WUS feedback signaling alter meristem size and lead to changes in inflorescence size and floral organ number. *Arabidopsis* clv1, clv2, and clv3 mutants have enlarged meristems with supernumerary floral organs, including carpels that give rise to fruit and seed (Clark et al., 1997; Brand et al., 2000). In *Brassica* spp., clv3 mutants have multilocular siliques and increased seed production (Fan et al., 2014; Yang et al., 2018).

The agricultural gains from disrupted meristem homeostasis are exquisitely demonstrated in tomato (*Solanum lycopersicum*) and maize (*Zea mays*). In tomato, mutations in the SlCLV1 ortholog, FASCIATED AND BRANCHED (FAB), and SlCLV2, and mutations that disrupt SlCLV3 expression (fasciated) or protein activity (fasciated inflorescence, fin, encoding a necessary arabinosyltransferase), and those that increase SlWUS activity (locule number), all result in meristem fasciation, extra floral organs, and large fruits with 12 or more locules for strong fin alleles (Cong et al., 2008; Munos et al., 2011; Rodriguez et al., 2011; Xu et al., 2015). Editing the SlCLV3 cis-regulatory regions yields tomatoes with a continuum of locule numbers (Wang et al., 2021). In maize, mutations in the CLV1 and CLV2 orthologs thick tassel dwarf and fasciated ear2 (fea2), respectively, and in a leucine-rich receptor like kinase encoded by fasciated ear3 (fea3) produce more rows of kernels per inflorescence (Taguchi-Shiobara et al., 2001; Bommert et al., 2005; Bommert et al., 2013; Je et al., 2016). QTL mapping and functional assays indicate that weak alleles of fea2 and fea3 contributed to maize domestication by increasing rows of kernels (Bommert et al., 2013; Je et al., 2016). This is further supported as generating weak alleles by editing ZmCLE promoters increases several yield-related traits in maize (Liu et al., 2021).

Cotton (*Gossypium* spp.) is a significant fiber crop and a valuable source of seed oil and protein. Although naturally a photoperiodic (short-day) perennial tree, cultivated cotton, mostly upland (*Gossypium hirsutum*; ~95% of world-wide production) and pima (*Gossypium barbadense*; ~5% of world-wide production), is grown as a day-neutral, annual crop. The earliest bolls generate seed fiber with the highest favorable attributes of length and strength, while those forming later in the season can have reduced quality, and consequently, value. Large scale, mechanical harvesting strategies favor single-pass harvesting late in the season, resulting in a less-than-desirable blend of high- and low-quality fibers for downstream processing. More determinate cotton architectures that synchronize flowering times and reduce branching can enhance crop yield and quality (Chen et al., 2015; Si et al., 2018; Chen et al., 2019; McGarry & Ayre, 2021). We previously demonstrated that SINGLE FLOWER TRUSS (GhSFT) and SELF-PRUNING (GhSP) influence cotton growth habit by regulating meristem phase change: high levels of GhSFT, encoding the long-distance flowering signal florigen, accelerated flowering, even in "early" day-neutral varieties; silencing GhSP expression terminated growth and vegetative branching (McGarry et al., 2016). Additional strategies to enhance yield, such as increasing the size of the earliest and highest-quality bolls, are sought, and could benefit newer technologies for more frequent robot harvesting as well as mitigate environmental impacts.

Cotton bolls on a single plant show inherent variation in locule number. For instance, pima cotton usually produce bolls with three or four locules, whereas upland cotton has four or five locules per boll, and bolls with six locules are rare (Dunlavy, 1921). A higher proportion of five-locule bolls per plant, preferred by producers, is associated with general crop vigor, meaning optimal water, nutrients, light, and temperature. Understanding the genetic regulation of cotton meristem homeostasis offers untapped potential to impact boll size and crop value.

While numerous CLAVATA3/EMBRYO SURROUNDING REGION-RELATED (CLE) genes are recently identified in cotton (Wan et al., 2021), the molecular mechanisms underlying meristem homeostasis are not addressed. This example examines functional assessment of genetic networks regulating meristem size in cotton, and approaches for manipulating activities of specific cotton genes to increase boll size. To this end, cotton orthologs of the CLV-WUS meristem maintenance circuit were identified, and these regularity networks were transiently perturbed to investigate their roles in meristem fasciation. A separate and expanded role was identified for meristem maintenance gene SELF-PRUNING in meristem homeostasis. Further investigation showed that regulated expression of GhSP facilitated access of other virus-based signals to cotton meristems.

Materials and Methods

Phylogenetics Analyses

The cotton orthologs of *Arabidopsis* and tomato genes active in the CLV-WUS stem cell maintenance circuit were identified using the *Gossypium hirsutum* v2.1 genome (Chen et al., 2020) available at Phytozome v13 (Goodstein et al., 2011) and CottonGen (Yu et al., 2021). Orthologs CLV3, CLV2, CLV1, FIN, PAN, WUS, and SP were identified. AtCLV1 and SlCLV1 proteins were aligned with cotton homologs using CLUSTAL multiple sequence alignment tool MUSCLE with default parameters (Edgar, 2004). The alignment was manually trimmed at the amino and carboxy termini, and used to construct a phylogenetic tree by neighbor-joining. The phylogeny was tested by the bootstrap method with 1000 iterations in Mega X (Kumar et al., 2018). The Poisson substitution model and pairwise deletion of gaps/missing data were default parameters used.

Virus Constructs

Virus induced gene silencing (VIGS) target sequences were designed within the coding sequences of each gene, and the specificity of each was predicted using the SolGen VIGS tool (Fernandez-Pozo et al., 2015). The VIGS target sequences were expected to silence the A and D homeologs, and included 494 nts of GhCLV1 (spanning nts 1649-2142 of coding sequence Gohir.D02G098300); 500 nts of GhCLV2 (nts 1-500 of coding sequence Gohir.D04G026500); 255 nts of GhCLV3 (full Gohir.D08G087400 coding sequence); 432 nts of GhFIN (nts 1-432 of coding sequence Gohir.D06G184700); and 300 nts of GhPAN (nts 1081-1380 from the coding sequence of Gohir.A12G169200). For each VIGS target sequence, the A and D sub-genome homoeologs differed by, at most, 11 non-contiguous nucleotides. Target sequences were synthesized by Twist Bioscience (San Francisco, CA, USA) and incorporated unique XbaI and SacI restriction sites at the 5' and 3' ends, respectively; the GhCLV3 coding sequence incorporated 5' XbaI SphI sites and 3' NheI SacI sites. Sequences for VIGS were digested with XbaI and SacI (New England Biolabs, Ipswich, MA, USA), and ligated into the same sites of pYL156 (TRV RNA2) (Burch-Smith et al., 2006) to generate pYL156:GhCLV1, pYL156:GhCLV2, pYL156:GhCLV3, pYL156:GhFIN, and pYL156:GhPAN. The GhCLV3 coding sequence was released by SphI and NheI digests and ligated into the same sites of pJRTCL-CrVA.008 (Tuttle et al., 2008) to construct gain-of-function vector pJRTCLCrV:GhCLV3. This vector was digested with XbaI and SacI and cloned into the same sites of binary vector pAgroJRTCLCrVA (Tuttle et al., 2012), producing dCLCrV:GhCLV3.

To construct viruses co-silencing GhSP with a second target gene, the Twist Bioscience cloning vectors described above were digested with XbaI and SacI to release each insert, and pART7-GhSP (Prewitt et al., 2018) was digested with EcoRI and XbaI to release the GhSP fragment. These fragments were ligated into pYL156 digested with EcoRI and SacI to produce pYL156:GhSP-GhCLV1, pYL156:GhSP-GhCLV2, pYL156:GhSP-GhCLV3, pYL156:GhSP-GhFIN, and pYL156:GhSP-GhPAN.

The cotton orthologs of the *Arabidopsis* AGAMOUS (At4g18960) were identified as tandem repeats on the A and D sub-genomes (Gohir.A10G033000, Gohir.A10G033100, Gohir.D10G033700, and Gohir.D10G033800). VIGS targeting sequences were designed against the K-box and spanned nts 599-865 of Gohir.A10G033000, or the MADS box and included nts 125-320 of Gohir.A10G033000. Each VIGS targeting sequence was PCR-amplified from cotton meristem or flower cDNA using oligonucleotides Kbox-fwd (5': tccaaaTCTAGAGAGCTGTTGTTTGCTGAAATAGAG) (SEQ ID NO: 5) and Kbox-rev (5': ctcgtgCTCGAG-GAGCTCGACTAGTTGAAGAACTATCTGGTCTTGC) (SEQ ID NO: 6), or MADS-fwd (5': ctcgtgTCTAGAATGGTGTACCCCAACGAATCCCTTG) (SEQ ID NO: 7) and MADS-rev (5': ctcgtgCTCGAG-GAGCTCTGGAGAAGACAATCAAAGCAACCTC) (SEQ ID NO: 8). PCR products were digested with XbaI and XhoI, and cloned into the same sites of pYL156 to create pYL156:GhAG(Kbox) or pYL156:GhAG(MADS), respectively. To co-silence each with GhSP, pYL156:GhSP-GhCLV2 was digested with XbaI and XhoI, releasing the GhCLV2 fragment, and gel-purified; the digested PCR products were ligated into the same sites to yield pYL156:GhSP-GhAG(Kbox) or pYL156:GhSP-GhAG(MADS).

Plants and Growth Conditions

*G. hirsutum* accessions Coker 312 and short-day photoperiodic accession Texas 701 were used in inoculation experiments. Seeds were germinated in 3.5 inch square pots with Metro-Mix 852 growth mix and placed in a growth chamber at 25° C. (16 h light/8 h dark) with balanced warm and cool white T5 fluorescent lights.

Virus Inoculations

Each viral vector was introduced to *Agrobacterium tumefaciens* GV3101 pMP90 by electroporation. Single colonies were cultured for Agro-inoculation as described (McGarry et al., 2016). TRV and dCLCrV are bipartite viruses: *A. tumefaciens* strains harboring each genome were cultured and prepared separately; equal volumes of inoculum were mixed immediately before infiltration. Agro-inoculation of viruses was delivered to saturation into the cotyledons of seedlings at 4 d post-germination using a 1 mL syringe. At minimum, six plants were infiltrated with each virus. Inoculated plants were covered with plastic domes overnight at room temperature, and then transferred to a growth chamber at 25° C. (16 h light/8 h dark) for 3 weeks. Plants were transplanted to 4.5 L pots with Metro-Mix 852 growth mix and grown to maturity in a greenhouse (16 h light/8 h dark, 30° C./25° C.) with supplemental lighting provided by metal halide and mercury lamps (light intensity at leaf level was 1300 µmol photons $m^{-2}$ $s^{-1}$). Each virus was tested in at least two independent greenhouse experiments.

RNA-Seq Libraries

At 15 dpi, apices from three replicate co-silenced plants and controls were harvested into acetone. Acetone was changed twice, and samples were stored at 4° C. before processing. With the aid of a SMZ1500 stereomicroscope (Nikon, Melville, NY, USA), meristems were dissected from apices and returned to acetone. Acetone was removed and meristems were frozen in liquid nitrogen and homogenized using a Retsch mill (MM400). RNA was isolated by hot borate (Wan & Wilkins, 1994) followed by column clean-up (Zymo Research, Irvine, CA, USA). Total RNA concentration was determined by nanodrop, and 20 ng was used to prepare libraries with NEBNext® Single Cell/Low Input RNA Library Prep Kit for Illumina. Library quality was assessed at the University of North Texas Health Science Center Genomics Core Facility (Fort Worth, TX, USA) by Agilent High Sensitivity D5000 Screen Tape assay (Agilent Technologies, Santa Clara, CA, USA). Libraries with concentrations 2 nM were sequenced for 75 cycles on an Illumina NextSeq 550 Sequencer (University of North Texas Health Science Center Genomics Core Facility). In total, libraries from three biological replicates from TRV:GhSP-, TRV:GhSP-GhCLV1-, TRV:GhSP-GhCLV2-, and TRV:GhSP-GhCLV3-infected plants, and two biological replicates from TRV-, TRV:GhSP-GhPAN-, and TRV:GhSP-GhFIN-infected plants were of suitable quality for sequencing.

Clustering differed between flowcells, with the first generating ~387×$10^6$ clusters and the second producing ~56×$10^6$ clusters. Samples from the lower-yielding flowcell were repeated, and the sequences generated from this third flowcell, with ~46×$10^6$ clusters, were incorporated. Read quality was determined using FASTQC in the CyVerse Discovery Environment (Goff et al., 2011), with median quality scores 32 for 75 bp reads. The reads generated from four lanes for each sequenced library were concatenated. The sequencing yields per sample were determined (data not included). Reads were mapped to the G. hirsutum v2.1 genome (Chen et al., 2020) and transcripts assembled using RMTA_v2.6.3 in the CyVerse Discovery Environment. Differential expression was determined using Cuffdiff2 (Trapnell et al., 2010). Normalized expression data was reported as fragments per kilobase of transcript per million mapped reads (FPKM).

Previously published transcriptomes are publicly available in the NCBI Gene Expression Omnibus (GSE144546).
Results
Identifying the CLV-WUS Cotton Orthologs CLV3 is the founding member of the CLAVATA3/EMBRYO SURROUNDING REGION-RELATED (CLE) genes, which encode a large family of small extracellular signaling ligands. CLE propeptides, harboring an amino-terminal signal sequence and conserved CLE domain near the carboxyl terminus, are proteolytically processed to the 12-14 amino-acid CLE motif and post-translationally modified (Fletcher, 2020). To identify the cotton CLV3 orthologs, the AtCLV3 (At2g27250.3) and SlCLV3 (Solyc11g071380) propeptide sequences were queried against the G. hirsutum v2.1, G. barbadense v1.1, and G. raimondii v2.1 databases using tBLASTn and BLASTp searches. Expression of each transcript was determined for different cotton meristems and the flanking leaves as reported in FPKM. These CLV-WUS gene orthologs were weakly expressed in different cotton meristems. (data not shown).

These searches identified two homologs in G. hirsutum (Gohir.A09G098550 and Gohir.D09G097950) and G. barbadense, (Gobar.A09G103400 and Gobar.D09G110700), and a single protein in G. raimondii (Gorai.006G114900); each cotton protein shared 70 and 77% amino acid identity with the Arabidopsis and tomato proteins, respectively. As there is typically low sequence conservation outside of the CLE domain (Sharma et al., 2003; Strabala et al., 2006), the processed AtCLV3 and SlCLV3 peptides, consisting of only the 13 amino acid CLE box (in Arabidopsis: LRTVPSGPDPLHH (SEQ ID No: 3) and in tomato: LRGVPAGPDPLHH, SEQ ID NO: 4), were queried against the G. hirsutum database in BLASTp searches, and two additional homologs were identified, Gohir.A08G077600 and Gohir.D08G087400, sharing 83% identity. The G. hirsutum proteome was then queried for all CLV3-like peptides, and 61 CLE-related proteins were identified. The strength of the consensus CLE box was determined among the 61 CLE-related cotton proteins using motif-based sequence analysis tools (data not shown) (Bailey et al., 2015). MEME and MAST analyses identified the CLE motifs in Gohir.A08G077600 and Gohir.D08G087400 as significantly more similar to the consensus ($p=2.4\times10^{-16}$) than Gohir.A09G098550 and Gohir.D09G097950, supporting these homeologs as candidate GhCLV3 ligands for initial functional analysis.

Multiple receptors, typically leucine-rich repeat receptor-like kinases, can perceive the CLV3 secreted ligand (Fletcher, 2020). To identify the cotton orthologs of receptor proteins CLV1 and CLV2, the Arabidopsis and tomato protein sequences were queried against the G. hirsutum genome in tBLASTn searches: AtCLV1 (At1G75820) and SlCLV1 (FAB; Solyc04G081590) each identified 96 homologs; AtCLV2 (At1G65380) identified 34 homologs in cotton. Phylogenetic analysis of the strongest cotton CLV1 hits identified two homologous pairs of proteins, Gohir.A02G082800, Gohir.D02G098300, Gohir.A05-G185500, and Gohir.D05G188300, as orthologous to AtCLV1 and SlCLV1 (data not shown). The corresponding Gohir.A02G082800 and Gohir.D02G098300 genes shared similar exon/intron organizations with AtCLV1, supporting these as candidate GhCLV1 genes for functional testing. Two cotton CLV2 homologs, Gohir.A05G390700 and Gohir.D04G026500, shared 63% amino acid identity with AtCLV2, and the corresponding genes were used in subsequent functional analyses.

The arabinosyltransferase FASCIATED INFLORESCENCE (SlFIN), and transcription factor PERIANTHIA (AtPAN) and the maize ortholog FASCIATED EAR4 (ZmFEA4) affect the CLV-WUS circuit to regulate meristem size (Running & Meyerowitz, 1996; Chuang et al., 1999; Pautler et al., 2015; Xu et al., 2015). To identify the cotton orthologs, the SlFIN (Solyc11g064850) and AtPAN (At1g68640) peptide sequences were queried against the cotton proteome. The strongest hits, sharing the greatest identity over the full protein sequence, were used for functional analyses.

Cotton CLV-WUS Orthologs are Expressed in Meristems

As the components of the CLV-WUS feedback circuit are believed to regulate meristem size, and in other systems their expression is exquisitely restricted to specific domains of the meristem, publicly available cotton meristem transcriptomes were mined to quantify expression levels (NCBI GEO GSE144546). Meristems and immature flanking leaves were isolated from seedlings of day-neutral and photoperiodic cotton, and from the apices of the main stem and branches of mature photoperiodic plants grown under inductive short-day conditions or non-inductive long days (Prewitt et al., 2018). The CLV-WUS homologs were lowly expressed in meristems at all stages tested.

Expression of each transcript was determined for different cotton meristems and the flanking leaves as reported in FPKM. These CLV-WUS gene orthologs were weakly expressed in different cotton meristems. (data not shown). Only GhCLV1 showed a significant increase in expression in branch meristems from mature, short-day grown plants compared to seedlings. As previously reported, GhSP was significantly enhanced in meristems isolated from the branches and main stems of plants grown under short days (Prewitt et al., 2018). The expression patterns of the cotton CLV-WUS homologs were generally consistent with predicted roles in meristem regulation.

It was demonstrated that GhSFT and GhSP acted through diverse genetic networks to impact different metabolic pathways and developmental patterns (McGarry et al., 2020) which is incorporated by reference herein). To test if the CLV-WUS meristem maintenance genes interacted with GhSFT or GhSP, a weighted gene co-expression network analysis was used. Fifty-four cotton libraries, comprised of meristems harvested at different developmental stages and from different photoperiods, and from the apices of TX701 and DP61 plants with altered expression of GhSFT and GhSP, were used for co-expression analysis (McGarry et al., 2020). Among the 16 modules of co-expressed genes, one WUS homolog, Gohir.A10G098300, was significantly co-regulated with GhSP (data not shown). None of the other cotton CLV-WUS genes was co-expressed with GhSFT or GhSP. It was then questioned how accelerating meristem determinacy, by over-expressing GhSFT or silencing GhSP (McGarry et al., 2016; Si et al., 2018; Chen et al., 2019), affected the CLV-WUS circuit. Apices from day-neutral DP61 or photoperiodic TX701 with altered GhSFT or GhSP expression levels were isolated and transcriptomes prepared as described (NCBI GEO GSE144546) ((McGarry et al., 2016) incorporated herein by reference). As shown in Table 1, below, changes in GhSFT or GhSP did not affect the expression of genes involved in meristem maintenance. The GhCLV3 and GhWUS genes were barely detected, likely reflecting the dilution of their low expression in apices, whereas GhCLV1, GhCLV2, GhFIN, and GhPAN showed relatively consistent expression across treatments within each genotype. These findings suggested that, in general, genes of the CLV-WUS circuit functioned independently from GhSFT and GhSP.

Transiently Disrupting Gene Expression Alters Flower and Fruit Morphology

Tobacco rattle virus (TRV) and the disarmed Cotton leaf crumple virus (dCLCrV) are highly effective tools for manipulating gene expression in cotton (Tuttle et al., 2008; Gao et al., 2011; Qu et al., 2012). TRV is a potent vehicle for virus induced gene silencing and dCLCrV can deliver gene activity when target sequences are expressed in the sense orientation or mild VIGS when targets are oriented in the antisense direction (McGarry & Ayre, 2012; McGarry et al., 2016).

It was then tested if cotton CLV-WUS orthologs have roles in balancing stem cell maintenance with cellular differentiation, altering their expression using virus-based gene manipulation may impact growth patterns and, most noticeably, affect flower and fruit development. To test this, each gene from TRV was silenced and GhCLV3 was over-expressed from dCLCrV in day-neutral Coker 312. Transient manipulation of meristem homeostasis genes affected the transition to flowering and floral organization. Silencing GhCLV2 from TRV significantly delayed the onset of reproductive growth compared with controls, as quantified by the node of the first fruiting branch (FIG. 1). This was not observed with any other treatment and suggested that GhCLV2 is required for the normal transition to flowering. This finding is consistent with reports of defective flowering in clv2 mutants specifically in the Arabidopsis Col-0 ecotype (Jones et al., 2021). Altering GhCLV3 expression affected floral meristems. Cotton plants over-expressing GhCLV3 from dCLCrV produced clusters of small floral buds at apices yet had fewer fruits compared with uninoculated and dCLCrV-infected plants (not shown). Conversely, silencing GhCLV3 from TRV produced floral buds with multiple unfused carpels (not shown). These findings supported roles for the cotton orthologs in meristematic activities.

To determine whether virus-mediated changes to target gene expression affected fruit size, the number of locules present per flower or fruit were quantified from three replicate plants of each treatment. As shown in FIGS. 2A and 2E, developing fruits from Coker 312 typically had four or five evenly-distributed locules, with septa separating each and joining in the center (columella). Similar distributions and numbers of locules were observed among TRV- and dCLCrV-infected Coker 312 plants (FIG. 2E). VIGS plants showed fewer bolls with four locules per fruit and/or a small proportion of fruit with additional locules (FIG. 2E). Notably, extra locules were not part of the outer fruit wall. As examples, TRV:GhCLV3-infected plants produced fruits with an extra locule squeezed in between more prominent locules; ectopic ovules; and/or an enlarged central columella with ovules (FIGS. 2B-2D). These increases in fruit complexity were not evident from intact bolls as the pericarps showed four or five septa. Over-expressing GhCLV3 rarely produced fruits with 3 locules (FIG. 2E). Collectively, these results supported that the cotton gene products functioned in the CLV-WUS meristem circuit, and transiently down-regulating their expression modestly fasciated floral meristems in a manner suggesting late timing or low penetrance of the silencing signals.

Co-Silencing Meristem Homeostasis Genes with GhSP Exacerbates Meristem Defects

Figure 3A:
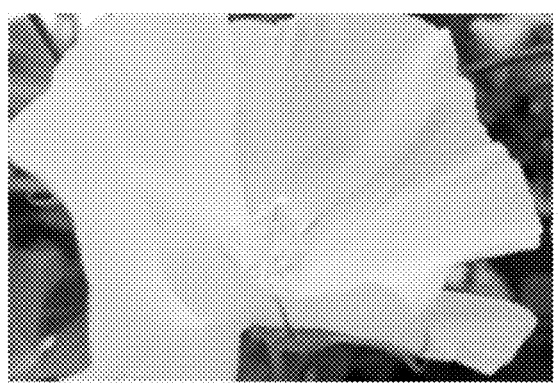
FIGS. 3A-3H are images illustrating that co-silencing meristem homeostasis genes with GhSP enhances fasciation. A cotton flower typically has five petals, as shown in this flower from an uninoculated Coker 312 plant (FIG. 3A). The stamens surround the styles, and four or five fused stigmas are evident.
Figure 3B:
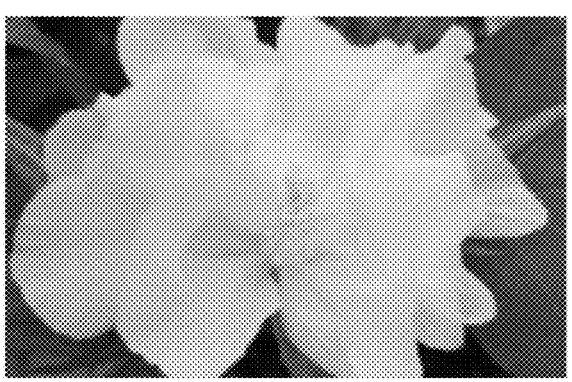
Figure 3C:
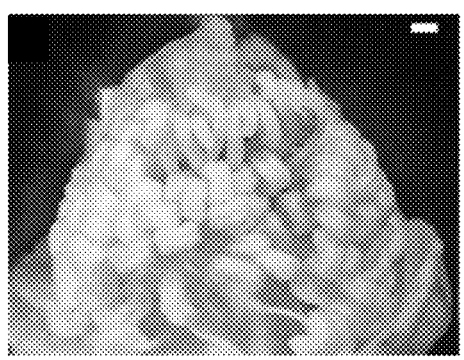
Figure 3D:
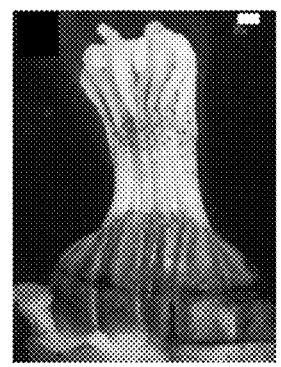
Figure 3E:
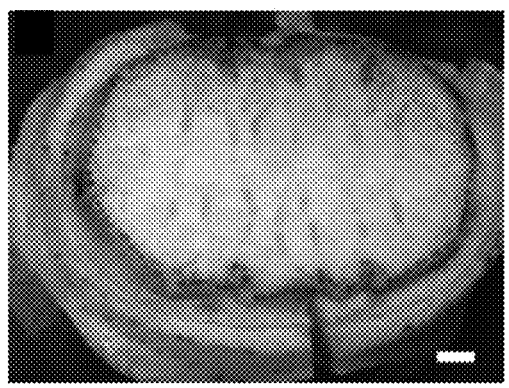
Figure 3F:
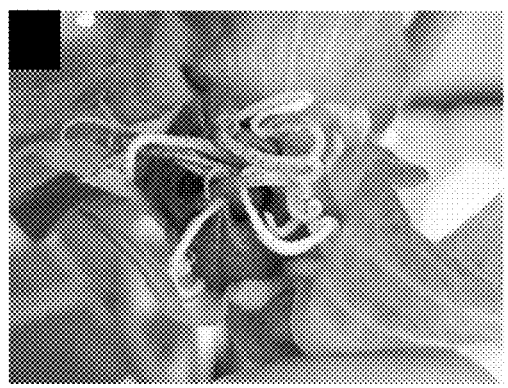
Figure 3G:
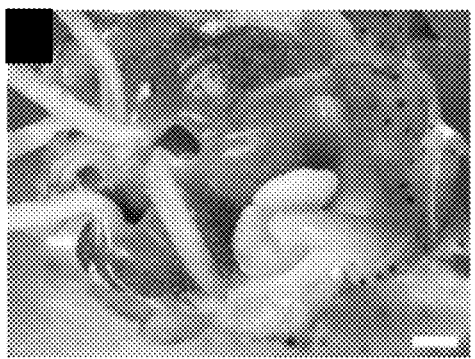
Figure 3H:
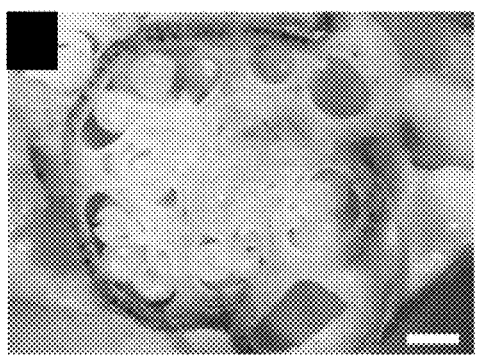
Figure 7A:
FIGS. 7A-7F illustrate schematics of T-DNA constructs for gene editing. Cas9 (FIG. 7A) and Cas12a (FIG. 7B) are introduced to cotton explants. Cas9 with sgRNA separated by tRNAGly (FIG. 7C) or with inducible embryogenic genes (FIG. 7E) are delivered on the same T-DNA. Cas12a with crRNAs (FIG. 7D) or with inducible embryogenic genes (FIG. 7F) are delivered on the same T-DNA to cotton explants.
Figure 7B:
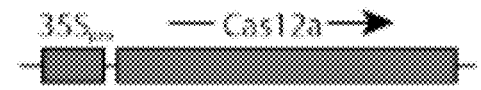
Figure 7C:
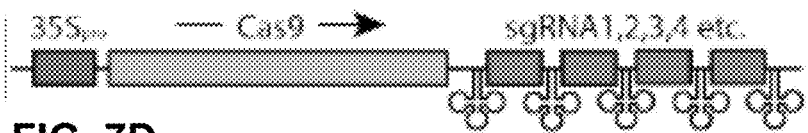
Figure 7D:
Figure 7E:
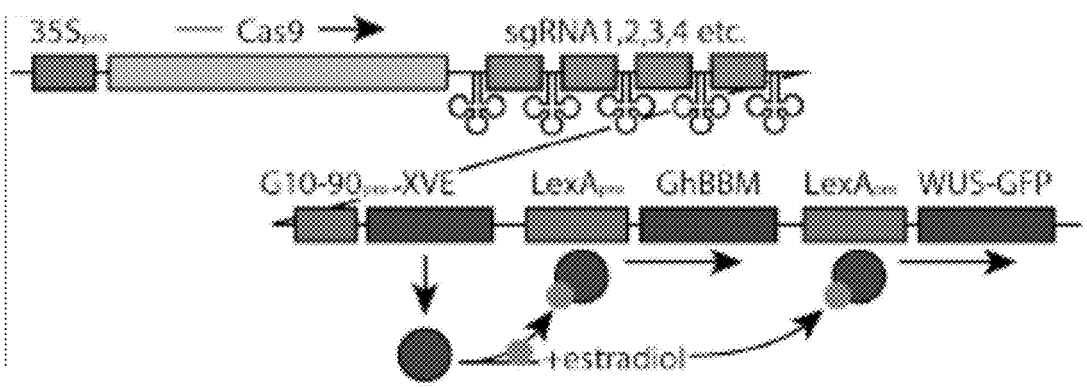
Figure 7F:
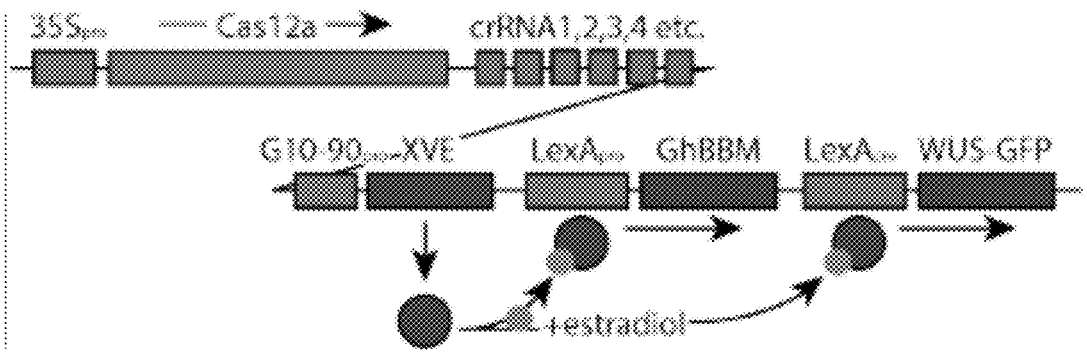

To test if low incidences of floral meristem fasciation were due to the instability of TRV at elevated temperatures and prolonged time to flowering and fruiting (Senthil-Kumar & Mysore, 2011), the GhSP silencing signal was included on each TRV virus. It was tested if silencing GhSP would accelerate termination, with a distinctive pattern marking flowers where the second meristem silencing signal would be active. Plants co-silencing GhSP with a target gene of the CLV-WUS circuit consistently yielded the GhSP-silenced phenotype: growth terminated by the $5^{th}$ node with a terminal flower and all axillary buds terminated with flowers. Flowers from co-silenced plants showed pronounced disruptions to floral organization not observed in TRV:GhSP-silenced, TRV-infected, nor uninoculated plants (FIGS. 3A-3H). TRV:GhSP-GhCLV2 plants consistently produced terminal flowers with expanded whorls of carpels and extended and unfused styles (FIGS. 3F-H). TRV:GhSP-GhFIN flowers displayed supernumerary organization of floral organs including extra petals, branched and lobed anthers, and multiple fused stigma and styles with ovaries showing increased numbers of locules (FIGS. 3C-E). TRV:GhSP-GhPAN-inoculated plants showed supernumerary petals (FIG. 3B), and increased complexity of the gynoecium (compare FIG. 3E, H with FIG. 2A).

To confirm these findings using a different cotton accession the experiment was repeated in a different cotton cultivar. Wild, photoperiodic Texas 701 are tall, lanky plants, with pronounced apical dominance (McGarry & Ayre, 2012). While these short-day photoperiodic cotton remained vegetative under non-inductive long days (McGarry & Ayre, 2012), TRV:GhSP-infected Texas 701 terminated by the $5^{th}$ node irrespective of day-length, and the induced terminal and axillary flowers were productive (McGarry et al., 2016). When Texas 701 plants were infected with TRV viruses targeting GhSP alone or with a target of the CLV-WUS circuit and grown under non-inductive long days, growth terminated. Co-silenced plants produced flowers with six to ten petals (FIGS. 5B-5C) whereas flowers from TRV:GhSP-infected plants consistently had five petals (FIG. 5A). Notably, one of the TRV:GhSP-GhFIN-infected plants produced a fasciated boll with six septa evident on the pericarp (FIG. 5E) while TRV:GhSP-infected Texas 701 yielded bolls with three or four locules (FIG. 5D). The uninoculated and TRV-infected controls remained vegetative and did not flower. The findings from this experiment were consistent with results in Coker 312 (FIGS. 3A-3H) and emphasized that altered GhSP levels magnified defects in meristem homeostasis.

To test if the observed phenotypes were consistent with expected changes in target gene expression, transcript levels in isolated meristems from co-silenced Coker 312 plants were measured. At 15 days post-inoculation, meristems were harvested from three replicate plants, RNA isolated, and libraries prepared for Illumina sequencing. As shown in Table 2, silencing GhSP with TRV consistently reduced GhSP expression in meristems. This finding supports the observed terminated phenotype in all TRV:GhSP-treated plants, and is consistent with previous reports (McGarry et al., 2016). Similarly, GhCLV1, GhCLV2, GhCLV3, GhPAN, and GhFIN transcripts were reduced with their respective treatments compared with TRV or TRV:GhSP control treatments. Consistent with the early flowering resulting with GhSP silencing, GhPAN transcript levels increased in TRV: GhSP and co-silencing treatments compared with TRV alone. Notably, silencing GhSP did not significantly affect expression of GhCLV1, GhCLV2, GhCLV3, GhPAN, GhFIN, or GhWUS in isolated meristems (Table 2) or apices (Table 1). Taken together, these experiments demonstrate that co-silencing genes of the CLV-WUS circuit with GhSP enhanced the severity of meristem perturbations in different cotton accessions, and these phenotypes were consistent with quantitative changes in target transcript levels.

Manipulating Expression of Meristem Regulator GhSP Enhances Access to Cotton Meristems Why silencing GhSP enhanced the penetrance of other silencing signals was examined, particularly as reduced GhSP transcript levels did not result in concomitant reductions in CLV-WUS expression. Since GhSP controls meristem indeterminacy, it was believed that changing its expression may disrupt the spatial and temporal regulation of diverse signals affecting the meristem. To test this, AGAMOUS (AG), encoding the MADS-box transcription factor specifying androecium and gynoecium identities (i.e. C function) in floral meristems was silenced (see Example 2 and Table 3, below). When 193 nts of sequence targeting GhAG for co-silencing with GhSP in TRV:GhSP-GhAG (MADS) was delivered to day-neutral Coker 312 plants, plants with multiple flowers having extra whorls of petals in lieu of stamens and carpels were consistently observed (FIGS. 4E-4F). These phenotypes were not observed when GhAG was silenced alone, nor in TRV:GhSP silenced plants, TRV-infected, or uninoculated controls (FIGS. 4A-4D). In replicate experiments, TRV:GhSP-GhAG(MADS)-infected plants yielded flowers with smaller, petal-like structures surrounding reduced stamens and carpels, and these phenotypes were not observed in other treatments (data not shown). Taken together, these findings suggest that, in cotton, SELF-PRUNING has a role in meristem homeostasis and in controlling signals reaching the stem cell niche.

Discussion

Shoot architectures are controlled by proliferation, dormancy, and termination of meristems. The highly conserved CLV-WUS meristem maintenance circuit is involved in balancing the stem cell population with the differentiation of stem daughter cells. Disruptions to this circuit are demonstrated to profoundly impact meristem size (Fletcher, J C et al., 1999). In tetraploid *Brassica napus*, mutating both BnCLV3 homeologs via CRISPR/Cas9 mutagenesis produced multilocular siliques with significantly more seeds and greater seed weight than wild type or single mutants (Yang et al., 2018). Impressively, mutations in the tomato and maize homologs show substantial and quantitative changes in fruit size, and these mutations were drivers in crop domestication (Xu et al., 2015; Rodríguez-Leal et al., 2017; Chu et al., 2019; Liu et al., 2021; Wang et al., 2021). Leveraging this genetic circuit to increase yields in diverse agricultural crops is a highly desirable and sought-after goal, but not widely realized. In part, these limitations reflect the redundancy among the large gene families encoding receptors and secreted ligands, and diverse compensatory mechanisms used in different plants to safeguard meristem maintenance (Rodriguez-Leal et al., 2019; Liu et al., 2021; Wang et al., 2021). In addition, intertwining circuits regulate meristem homeostasis. The CLE40 secreted peptide controls the size of *Arabidopsis* shoot apical meristems in a negative feedback loop opposite to that of CLV3 (Schlegel et al., 2021). CLE40, which can compensate for CLV3 mutations, is secreted from the peripheral zone of the meristem and binds the BARELY ANY MERISTEM 1 (AtBAM1) receptor to activate WUS expression; CLE40 expression is negatively regulated by WUS. It is suggested that, together, the CLV3-CLV1 and CLE40-BAM1 circuits modulate WUS activity to balance the stem cell population with cellular differentiation.

In addition to its increasingly complex roles in regulating meristem phase change, SP, and its ortholog CENTRORADIALIS, may aid in maintaining and protecting the stem cell niche independently from the CLV-WUS circuit. As plants transition from vegetative growth to flowering, the shoot apical meristem enlarges and domes. In tomato, SP and genes of the CLV-WUS circuit promote this developmental process (Xu et al., 2015; Tal et al., 2017). The late termination (ltm) mutant shows precocious meristem doming, delayed flowering, and up-regulation of SP expression; similarly, 35S:SISP plants and fab mutants have more domed meristems. These findings suggest that LTM regulates SP expression to promote and co-ordinate growth of the primary shoot apical meristem with the floral transition (Tal et al., 2017). In doing so, SP protects meristems under strong floral-inducing signals (Tal et al., 2017).

In citrus (*Citrus sinensis* "Washington" sweet orange X *Poncirus trifoliata*), SP ortholog CsCEN safeguards meristem homeostasis to ensure continued vegetative growth from indeterminate meristems (Zhang et al., 2021). The leaf axils of most citrus species produce a determinate thorn and an indeterminate branch, and these structures result from the differential expression of CsCEN. In the indeterminate axillary meristem, CsCEN represses expression of thorn-specifying transcription factor THORN IDENTITY 1 (TI1); in the determinate vegetative meristem, where CsCEN is not expressed, TI1 represses WUS. Loss-of-function Cscen mutants have two axillary thorns and no branches whereas CsCEN gain-of-function produces bushy and thornless citrus plants. These findings suggest that CsCEN acts in indeterminate meristems to protect the WUS domain for continued vegetative growth.

The above findings in cotton show that GhSP had a role in meristem homeostasis and modifying GhSP expression dramatically enhanced the impact of other signals regulating meristem size. SP and CLV-WUS do not likely act in the same pathway since their altered expressions did not have reciprocal effects. Rather, the above-described experiments show that disruptions to SP expression manifested earlier and synergistically with disruptions to genes of the CLV-WUS circuit, suggesting overlapping functions in apical and axillary meristems. Altering GhSP levels enhanced the penetrance of other meristematic signals. Of particular note, co-silencing GhSP with GhAG impacted nearly every flower on infected plants. As AG suppresses WUS expression as part of the floral transition (Liu et al., 2011), these co-silencing experiments suggest that SP is needed to buffer strong meristem-terminating signals. As with tomato and citrus, we propose that, in cotton, SP protects the stem cell niche, possibly by co-regulating a GhWUS gene.

Shoot apical meristems are generally considered to be immune from virus infection. In *Arabidopsis*, WUS suppresses the accumulation of several viruses, including TRV, in meristems by repressing expression of methyltransferases and impairing protein synthesis to restrict viral replication and spread (Wu et al., 2020). Thus, in stem cells, WUS triggers antiviral immunity. The work presented here suggests that altering GhSP expression disrupted meristem homeostasis and increased access of virus-delivered signals to meristems. Our findings shed new light on meristem dynamics in general and consideration for targeting meristematic events in cotton.

TABLE 1

Changes in GhSFT or GhSP do not affect the expression of CLV-WUS genes in cotton apices.

| Gene name | Locus | DP61 uninoc | DP61 CLCrV-GhSFT | DP61 TRV-GhSP | TX701 uninoc | TX701 CLCrV-GhSFT | TX701 TRV-GhSP |
|---|---|---|---|---|---|---|---|
| CLV3 | Gohir.A08G077600 | 0.00 | 0.00 | 0.00 | 0.00 | 0.00 | 0.00 |
| CLV3 | Gohir.D08G087400 | 0.00 | 0.00 | 0.00 | 0.00 | 0.00 | 0.00 |
| CLV2 | Gohir.A05G390700 | 2.63 | 3.19 | 3.34 | 2.36 | 4.10 | 3.99 |
| CLV2 | Gohir.D04G026500 | 2.28 | 3.90 | 3.01 | 2.49 | 2.61 | 2.80 |
| CLV1 | Gohir.A02G082800 | 0.67 | 0.19 | 0.27 | 0.34 | 0.52 | 0.53 |
| CLV1 | Gohir.D02G098300 | 0.33 | 0.41 | 0.76 | 0.28 | 0.84 | 0.97 |
| FIN | Gohir.A06G174700 | 11.51 | 8.52 | 8.65 | 8.56 | 9.27 | 8.34 |
| FIN | Gohir.D06G184700 | 6.97 | 6.06 | 4.01 | 6.33 | 5.16 | 5.52 |
| PAN | Gohir.A12G169200 | 1.82 | 2.51 | 3.73 | 2.43 | 1.75 | 0.00 |
| PAN | Gohir.D12G172500 | 0.78 | 2.65 | 3.16 | 0.38 | 0.69 | 0.89 |
| WUS | Gohir.A10G098300 | 0.10 | 0.00 | 0.00 | 0.00 | 0.00 | 0.00 |
| WUS | Gohir.A12G059800 | 0.00 | 0.00 | 0.00 | 0.00 | 0.00 | 0.00 |
| WUS | Gohir.D10G089500 | 0.00 | 0.18 | 0.15 | 0.00 | 0.00 | 0.00 |
| WUS | Gohir.D10G089000 | 0.72 | 1.38 | 1.10 | 1.87 | 1.36 | 1.12 |
| WUS | Gohir.D12G060100 | 0.00 | 0.00 | 0.00 | 0.00 | 0.00 | 0.00 |
| SP | Gohir.A07G109700 | 0.00 | 0.00 | 0.00 | 0.00 | 0.76 | 0.00 |
| SP | Gohir.D07G113500 | 1.94 | 2.03 | 0.00 | 0.00 | 0.00 | 0.00 |
| SFT | Gohir.A08G227700 | 0.00 | 0.62 | 0.00 | 0.00 | 3.5 | 0.00 |
| SFT | Gohir.D08G248000 | 0.40 | 34.22[a] | 0.33 | 0.00 | 103.45[a] | 0.00 |

The expression of each transcript from apices of plants with different GhSFT and GhSP expression is reported in FPKM values.
[a]Significantly different pair-wise comparisons at p < 0.05; reported p-values are corrected using the Benjamini-Hochberg method.

TABLE 2

TRV co-silences GhSP and components of the CLV-WUS circuit in meristems isolated from VIGS plants. Data are FPKM values from Coker 312 meristems isolated at 15 dpi.

| Gene name | Locus | TRV | TRV-SP | TRV-SP-CLV1 | TRV-SP-CLV2 | TRV-SP-CLV3 | TRV-SP-PAN | TRV-SP-FIN |
|---|---|---|---|---|---|---|---|---|
| CLV3 | Gohir.A08G077600 | 0.82 | 0.07 | 0.00 | 0.02 | 0.00 | 0.42 | 0.00 |
| CLV3 | Gohir.D08G087400 | 0.86 | 1.39 | 0.88 | 0.08 | 0.31 | 1.40 | 0.00 |
| CLV2 | Gohir.A05G390700 | 3.13 | 1.78 | 1.16 | 0.22 | 1.66 | 2.50 | 1.89 |
| CLV2 | Gohir.D04G026500 | 3.55 | 2.97 | 2.36 | 0.47 | 2.18 | 3.57 | 2.34 |
| CLV1 | Gohir.A02G082800 | 7.26[a] | 2.46 | 1.51[a] | 7.20 | 3.76 | 2.83 | 1.46 |
| CLV1 | Gohir.D02G098300 | 3.14 | 1.59 | 0.58 | 4.17 | 1.61 | 1.84 | 3.31 |
| FIN | Gohir.A06G174700 | 12.49 | 14.12[b] | 9.63 | 9.53 | 6.20 | 5.17 | 5.79[b] |
| FIN | Gohir.D06G184700 | 5.41 | 7.77[c] | 6.46 | 4.91 | 5.20 | 3.76 | 1.46[c] |
| PAN | Gohir.A12G169200 | 2.43 | 17.67 | 25.24 | 30.56 | 26.69 | 9.75 | 37.64 |
| PAN | Gohir.D12G172500 | 5.37 | 11.66[d] | 19.92 | 17.99 | 16.99 | 5.20[d] | 22.21 |
| WUS | Gohir.A10G098300 | 1.50 | 0.60 | 0.93 | 0.96 | 1.28 | 1.29 | 0.36 |
| WUS | Gohir.A12G059800 | 0.19 | 0.02 | 0.05 | 0.00 | 0.00 | 0.00 | 0.00 |
| WUS | Gohir.D10G089500 | 1.02 | 1.09 | 2.48 | 1.55 | 1.13 | 2.82 | 1.03 |
| WUS | Gohir.D10G089000 | 2.73 | 4.14 | 4.45 | 3.85 | 5.87 | 3.42 | 3.29 |
| WUS | Gohir.D12G060100 | 0.37 | 0.05 | 0.00 | 0.00 | 0.00 | 0.00 | 0.00 |
| SP | Gohir.A07G109700 | 7.50 | 0.19 | 0.25 | 0.00 | 0.24 | 0.24 | 0.00 |
| SP | Gohir.D07G113500 | 10.39 | 0.82 | 0.53 | 0.76 | 0.24 | 0.10 | 0.20 |

Significantly different pair-wise comparisons in target gene expression are indicated relative to TRV or TRV-SP controls with [a]p < 0.01, and [b,c,d]p < 0.05; p-values were corrected for false discovery using the Benjamini-Hochberg method.

Example 2—Altering Meristem Fate Increases the Potency of Other Meristem-Targeted Signals As described in Example 1 above, loss of meristem maintenance gene, such as GhSP, function facilitates entry of other signals to the meristems to impact meristem fate, and this benefits entry of other target sequences. Based on studies with silencing of GhSP and/or modification of GhSFT in cotton, it was further tested whether loss of GhSP may have a regulating effect that could in turn impact the effect of other genes. Thus, whether forcing meristems into a determinate fate could increase access of virus-based gene manipulation tools into the center of the meristem was examined. To test this, cotton AGAMOUS (GhAG) was targeted for silencing to test the effect on the spatio-temporal penetration of silencing signals into the meristem, such as whether early and complete silencing in the center of the floral meristem would result in homeotic conversion of stamens and carpels to repeating whorls of petals and sepals, whereas later and weaker silencing from limited access to the meristem center would result in less severe phenotypes. The results support this approach, as shown in Table 3, below.

TABLE 3

Impact of co-silencing GhSP and GhAG shows earlier and deeper penetration of the silencing signal to the center of the meristem

| Treatment | Days to Flowering | Flower Morphology |
|---|---|---|
| TRV | 41 | Wild type |
| TRV-GhAG | 42 | Wild type |
| TRV-GhSP | 27 | Wild type |
| TRV-GhSP-GhAG co-silenced | 30 | Partial or complete homeotic conversion to extra petals |

As illustrated in Table 3 and FIG. 4C in Example 1, above, GhAG silencing alone did not show any phenotype—all flowers were WT without visual evidence of homeotic conversion. However, co-silencing hAG with GhSP resulted in consistent formation of compound flowers through conversion of stamen and carpel whorls into petal-like structures (FIGS. 4E and 4F). The results of this experiment provide that forcing meristems into a determinate fate increases meristem accessibility to other silencing signals. Table 4 below describes some of the meristem genes tested in Example 1 above for co-silencing with SELF PRUNING.

TABLE 4

VIGS treatment to test if silencing genes in the cotton WUSCHEL:CLAVATA circuit can alter flower and boll size

| VIGS sequence | loci silenced* | Observed outcomes after silencing. |
|---|---|---|
| Uninoculated | | Uninoculated control- normal growth |
| TRV & CLCrV | | No-insert controls- normal growth |
| TRV:MgChl | A06G200700 D06G208200 A10G030400 D10G031300 | Mg$^{2+}$-Chelatase silencing results in bleached leaves and is an easily assayed control for infection efficiency |
| CLV3 VIGS | A08G077600 D08G087400 | Extracellular peptide in WUSCHEL:CLAVATA circuit; silencing increased meristem and fruit size; supernumerary locules observed. |
| CLV1 VIGS | A02G082800 D02G098300 | Receptor for CLV3 peptide; silencing increased meristem and fruit size; supernumerary locules observed. |
| CLV2 VIGS | A05G390700 D04G026500 | Receptor for CLV3 peptide; silencing increased meristem and fruit size; supernumerary locules observed. |
| FIN VIGS | A06G174700 D06G184700 | Arabinosyltransferase required for CLV3 function; silencing increased meristem and fruit size; supernumerary locules observed. |
| PAN VIGS | A12G169200 D12G172500 | PERIANTHIA encodes a b-zip transcription factor that activates AG expression to repress WUS; silencing increased meristem and fruit size; supernumerary locules observed. |
| AG VIGS | A10G033000 A10G033100 D10G033700 D10G033800 | AGAMOUS encodes a homeobox transcription factor that specifies stamen and carpel whorls in flowers and also negatively regulates WUSCHEL expression through PAN. Silencing AG produced multiple whorls of petals and reduced/absent stamens and carpels. |

*Both homoeologs are be silenced since sequences are too similar to silence individually.

Example 3—Increasing Susceptibility of Meristems to Virus-Based Tools

Discussion

This example describes the extension of the above-described virus-based strategies to deliver CRISPR-Cas editing tools to dividing meristematic cells as demonstrated with an embodiment including co-silencing GhSP to enhance CRISPR-mediated editing of genes relating to pest and pathogen resistance (it is understood that this same approach can be used for editing genes related to other aspects of plant development and traits). These methods could allow editing of dividing cells in plant meristems, leading to clonal sectors that give rise to edited germline cells in flowers, and ultimately edited seeds, all without tissue culture. The approach was that forcing meristems to a more determinate fate could increase access of virus-based tools to the meristem, to achieve meristem-based gene editing which will bypass conventional tissue culture phases (FIGS. 6A-6C).

Using CRISPR/Cas9 gene editing, four guide RNAs with intervening tRNA$^{Gly}$ sequences were engineered as shown in the schematic illustration of T-DNA constructs for gene editing with sgRNA and Cas9 or crRNA with Cas12a in FIGS. 7A-7F. These constructs were integrated in Cotton leaf crumple virus vectors (see e.g., FIG. 8).

Figure 9A:
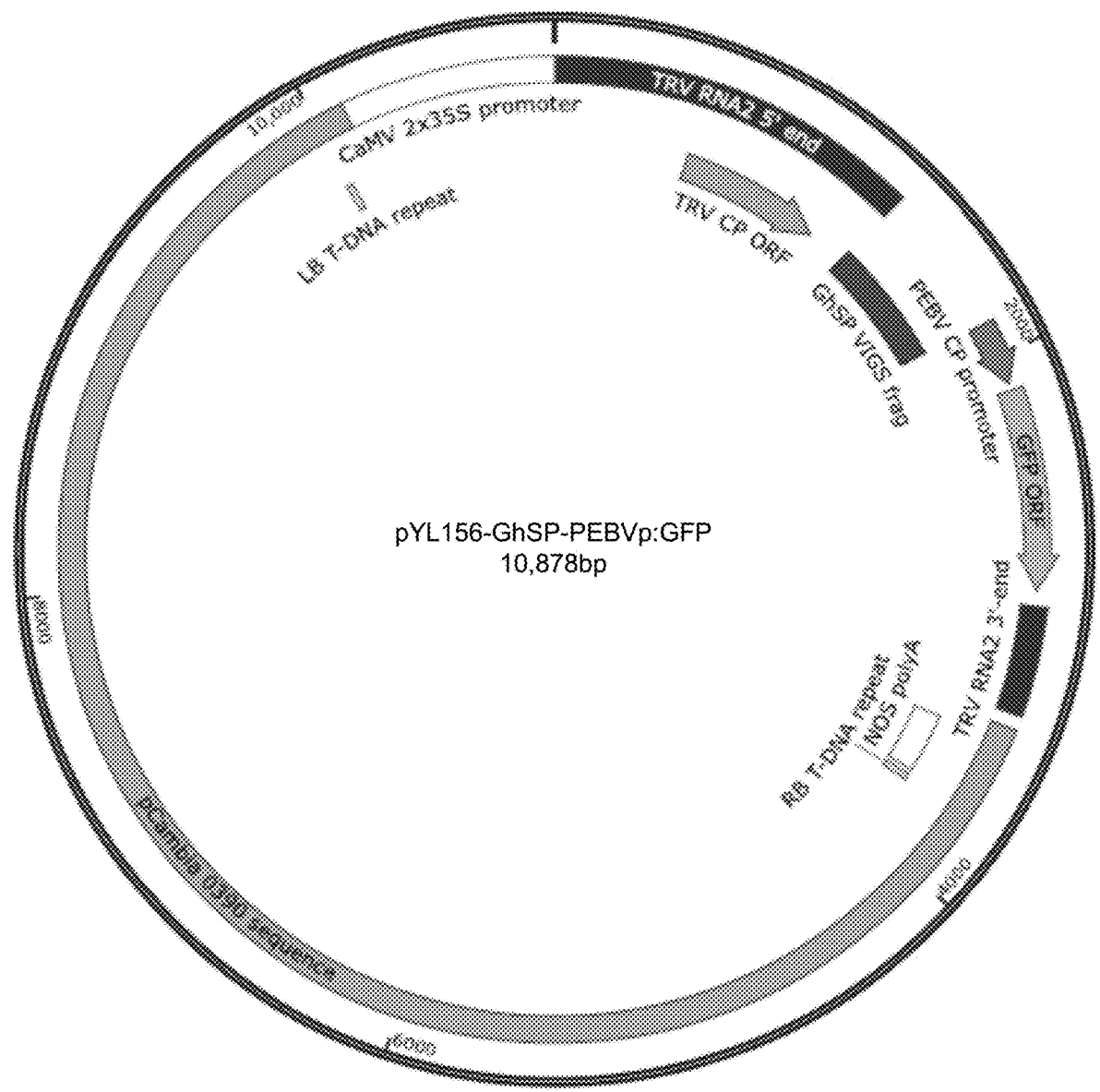
FIGS. 9A-9B illustrate an embodiment of a TRV vector pYL156 constructed to silence GhSP and confer gene expression from the Pea early browning virus (PEBV) promoter. Shown in FIG. 9A is the reporter gene Green fluorescent protein (GFP) expressed from the PEBV promoter.
Figure 9B:
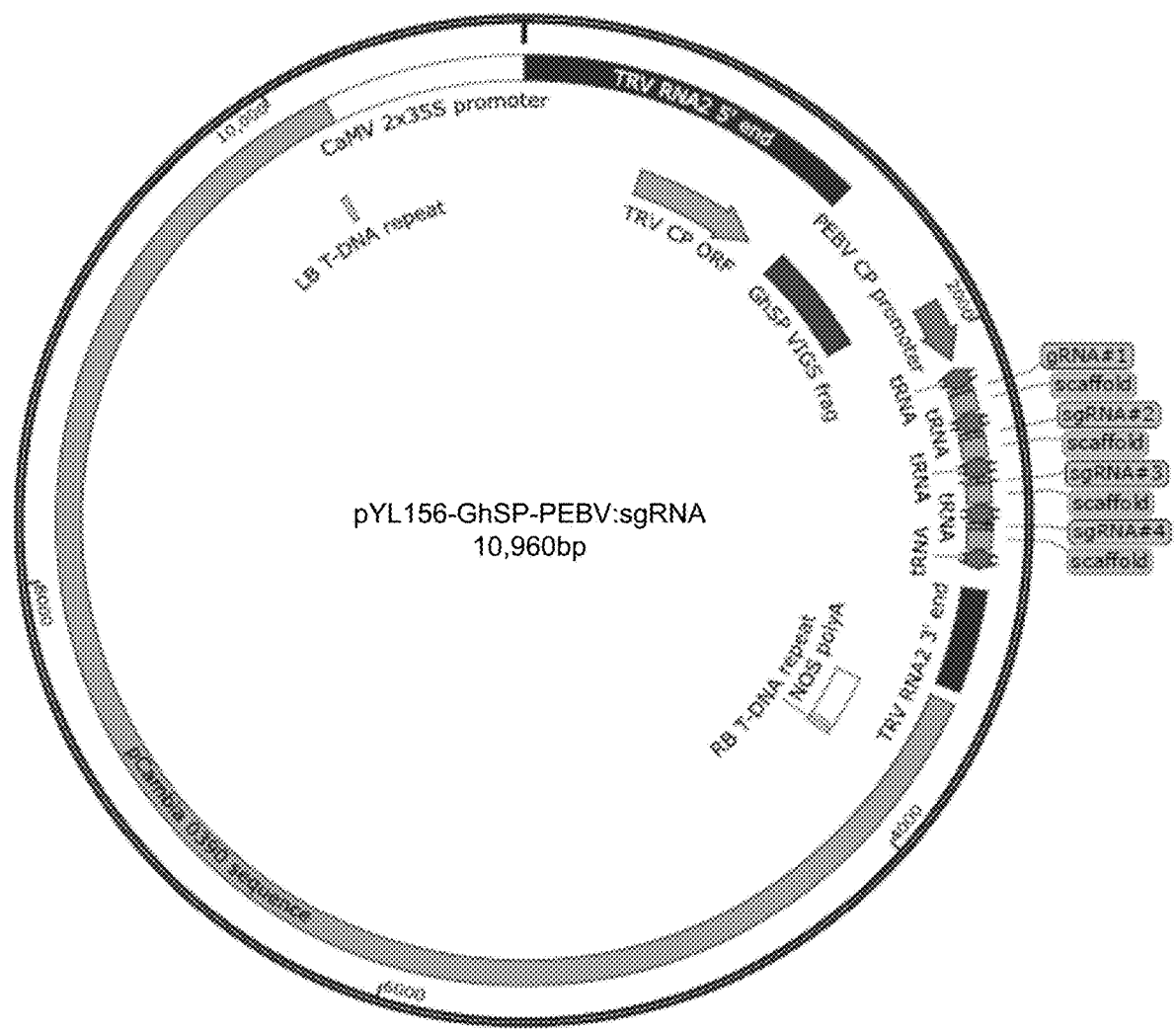

Briefly, the four guide RNAs in each virus target the coding or cis-sequences of genes in the CLAVATA-WUS-CHEL circuit. Each dCLCrV virus is co-inoculated with TRV:GhSP into 35S:GFP:Cas9:NLS Coker plants. Additional designs are being made of TRV to simultaneously silence GhSP and express the guide RNA-tRNA$^{Gly}$ cassette under control of a duplicated Pea early browning virus coat protein promoter in order to attempt to achieve systemic infections (FIGS. 9A-9B).

Materials & Methods

Design of DNA Constructs for Gene Editing

By way of example, for targeted gene editing, the CRISPR associated endonuclease (Cas) will be delivered with the single guide RNAs (sgRNAs) on a single T-DNA construct by Agrobacterium-mediated transformation. Vectors will be acquired from Addgene (www.addgene.org/) and modified as necessary. Experiments will be conducted with 2 Cas proteins, Cas9 and Cas12a (FIGS. 7A-7F). Cas9 is most widely used, but Cas12a has potential advantages. For instance, Cas12a (formerly, Cpf1) uses 23 nt guide sequences and a different PAM sequence to potentially reduce off target editing. Also, the total guide RNA length is shorter (44 nt crRNA for Cas12a vs. 100 nt sgRNA for Cas9) to benefit multiplexing Cas12a also processes its own guide RNAs, reducing the need for additional processing sequences, which also benefits multiplexing. Cas12a generates double-stranded breaks with staggered 5' ends and is reported to result in larger deletions, generally 5 to 12 nucleotides, around the target sequences in cotton (Li et al., 2019a; Manghwar et al., 2019).

Up to 8 sgRNAs (or crRNAs) were designed against the coding sequences of GhLOX1 and GhLOX5 using CRIPSR RGEN Tools (Bae et al., 2014; Park et al., 2015). For the Cas9 constructs, primers can be ordered incorporating 5' BsaI type IIS restriction endonuclease recognition sites, guide RNA sequences (20 nt for Cas9) and PAM sequence (5' NGG for Cas9). The PCR template for use with the primers contains the remainder of the sgRNA (the tracrRNA) and tRNAGly for processing. Cas12a crRNA arrays will be synthesized commercially to contain 23 nt of guide sequences, 5' TTTN PAM sequences, and the remaining scaffold sequences (TWIST Bioscience or similar). Standard protocols for synthetic biology are used to assemble plasmids. T-DNA from each binary vector will be delivered via *Agrobacterium tumefaciens* to Coker 312 and Jin668 hypocotyl explants; co-cultivation and regeneration will follow established protocols. Somatic embryo production was compared in Jin668 with Coker 312: Jin668 produced somatic embryos within 8 weeks while Coker 312 required ~15 weeks. This is consistent with published results (Li et al., 2019b).

Confirmation of mutation and transgene-free lineages: Desirable edits will be identified in GhLOX1 and GhLOX5 as shoots emerge from tissue culture using techniques described in Jacobs et al., 2015; Xue and Tsai, 2015; Zhou et al., 2015. The sgRNA and crRNA sequences target restriction endonuclease recognition sequences. PCR amplicons that include the target site will be digested and resolved on an agarose gel: an undigested band will indicate mutated sequences. In addition, amplicons from 96 (or more) samples will be barcoded with Illumina A500 and A700 index primers, pooled, gel-purified, and sequenced en masse with an Illumina MiSeq with PE150 reads. The presence or absence of mutations, and the nature of indels or SNPs, will be quantified from the ~1 million FASTQ files generated using the AGESeq (Analysis of Genome Editing by Sequencing) tool available from AspenDB (aspendb.uga.edu) (Xue and Tsai, 2015).

Gene editing during tissue culture is reported to be efficient in cotton (Janga et al., 2017; Wang et al., 2018), consistent with findings in other woody species (Bewg et al., 2018). The present example targets GhLOX1 and GhLOX5 simultaneously in these constructs (FIGS. 7C-F) and rely upon the amplicon sequencing of transformants after tissue culture to distinguish mutations in GhLOX1, GhLOX5, or both genes. Plants with desirable edits will be selfed and M1 seedlings analyzed by PCR and sequencing to confirm the heritability of the mutation. Lines of interest (e.g., homozygous mutation in LOX1 only, homozygous mutation in LOX5 only, and homozygous mutation in both), as well as lines with Cas9/12a only (no sgRNA in transforming vector—for use as founder lines) will be selfed to establish a population of $M_2$ seed. The $M_1$ generation harboring GhLOX1 and GhLOX5 edits will be screened for loss of the transforming T-DNA in order to obtain "transgene-free" lines. Most probably, the T-DNA will be in the $M_0$ generation as a single copy, but multiple inserts are possible and may complicate segregation. As required, we will cross to WT Jin668, Coker 312, or a desirable elite line, to obtain transgene-free germplasm with the desired edits. Out-crossing will also help remove any rare and unexpected off-target editing.

These results will contribute to gene editing strategies in cotton by providing quantitative results comparing the success of different genetic backgrounds, Cas endonucleases, and the addition of different embryogenic stimuli. It is believed that inclusion of inducible BBM and WUS accelerates the formation of embryos and lead to edited lines more swiftly and minimize somaclonal variation that arises from extensive tissue culture. Successfully combining efficient genome editing with developmental regulators can accelerate production of novel, engineered cotton varieties in any genetic background. Transgene-free germplasm with resistance to fungal pathogens and aphids and perhaps other biotic stressors will also be generated.

Meristem-Based Gene Editing

In plants like cotton, which are recalcitrant to transformation and regeneration, genome editing is currently only as efficient as the time-consuming and labor-intensive tissue culture regimes (Altpeter et al., 2016). The present example describes a new approach to edit dividing cells in plant meristems, leading to clonal sectors that give rise to edited germline cells in flowers, and ultimately edited seeds, all without tissue culture. Embodiments of this meristem-based gene editing system involves viral delivery of guide RNAs to Cas founder lines. The results provided in the Examples 1 above demonstrate that silencing GhSP increases meristem access to manipulation of other genes.

It is believed that loss of GhSP function facilitates entry of other signals to the meristems to impact meristem fate and will benefit entry of sgRNA and crRNA carried by viruses (FIGS. 6A-6C). Growing evidence supports that intercellular communication is involved in regulating meristem identity (Balkunde et al., 2017; Kitagawa and Jackson, 2017). Non-cell autonomous proteins and RNA species including siRNA, miRNA, mRNA, and tRNA, move cell to cell through plasmodesmata, and plasmodesmata frequency and size exclusion limits are dynamic during development, including during meristem phase change (Kehr and Kragler, 2018; Kitagawa and Jackson, 2017; Skopelitis et al., 2018; Zhang et al., 2009; Zhang et al., 2016).

Plasmid Construction

Figure 8:
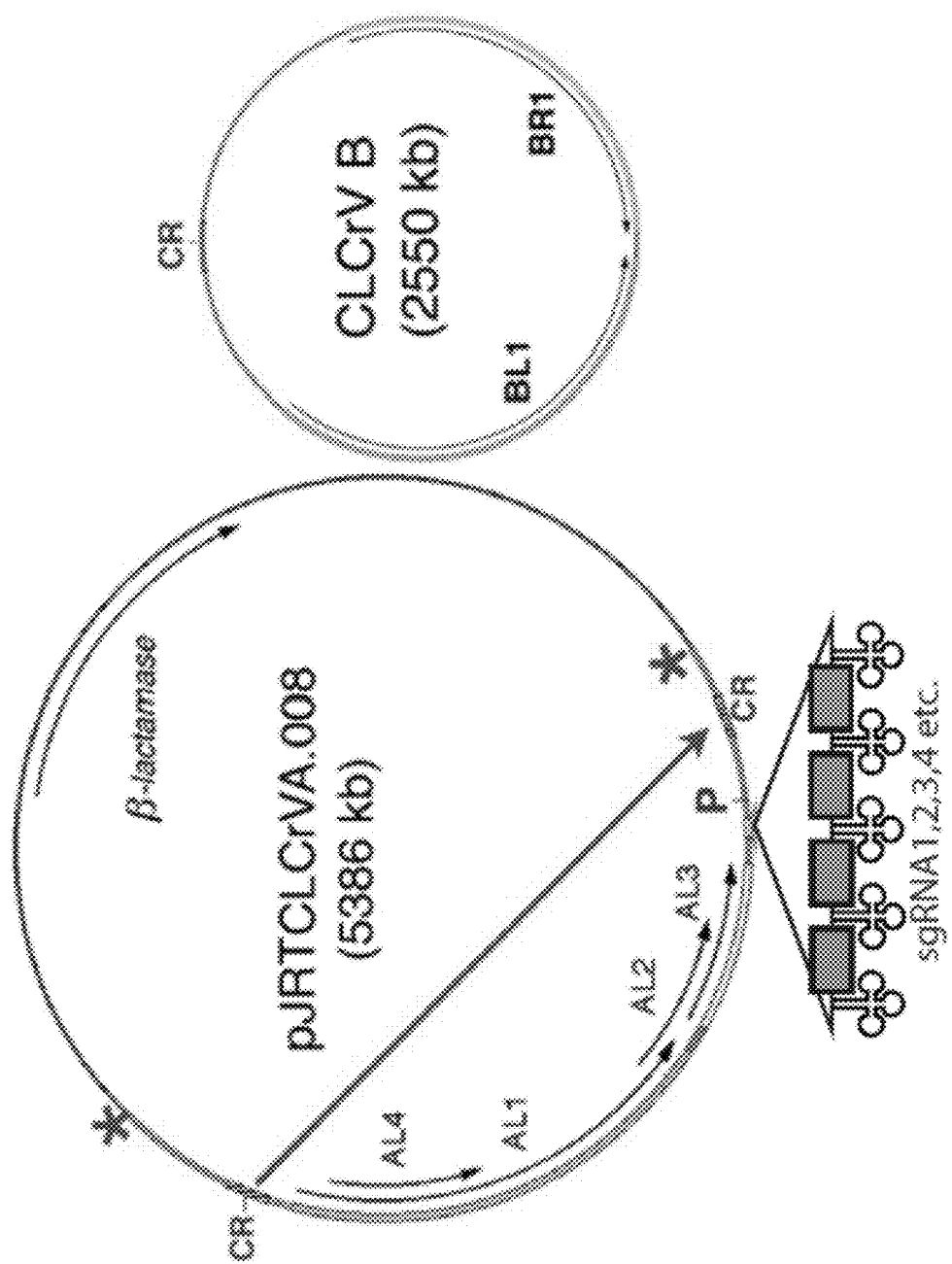
FIG. 8 illustrates Geminivirus delivery of sgRNAs. 4 sgRNAs, separated by tRNAGly sequences, are delivered to Cas9 cotton.

Geminiviruses are single-stranded DNA viruses that replicate to high copy numbers via a double-stranded DNA intermediate. The disarmed Cotton leaf crumple virus (dCLCrV) is used extensively for both VOX and VIGS (McGarry and Ayre, 2012; McGarry et al., 2016). Geminiviruses have emerged as useful multi-copy replicons for genome editing and gene targeting since they can be engineered to carry both the Cas9 gene and multiple sgRNAs (Baltes et al., 2014; Butler et al., 2016; Gil-Humanes et al., 2017). Large engineered geminivirus vectors containing Cas-encoding genes (3.5 to 4.0 kb) are too large to move systemically, but smaller constructs that carry sgRNA and crRNA, without exceeding the natural size of the viral genome, are mobile and stable. Modifications to dCLCrV are being made to incorporate crRNA (for Cas12a) and sgRNA with tRNA promoters and processing sequences (for Cas9; FIG. 8) (Cermek et al., 2017; Xie et al., 2015). These modified dCLCrV constructs harboring arrays of up to four tRNA-sgRNA sequences (~800 nt inserts replacing the ~800 nts coat protein gene) have been tested and found to have high titers of recombinant virus throughout mature cotton plants when analyzed 80 dpi.

sgRNAs against GhLOX1 and GhLOX5 were designed, and MgChl as a control, using CRIPSR RGEN Tools (Bae et al., 2014; Park et al., 2015). The sgRNAs target the cotton A and D homeologs. Four sgRNAs are selected with specificity for each gene and will be cloned in our dCLCrV-tRNAGly cassette. Using tRNAs for CRISPR editing by Cas9 is demonstrated to achieve a high frequency of mutations (Xie et al., 2015), significantly exceeding the frequency of mutations introduced using the U6 promoter or ribozymes (Cermek et al., 2017). It is noteworthy that $tRNA^{Gly}$ structural motifs are associated with the cell-to-cell movement of mRNA in plants (Zhang et al., 2016), and these may thus benefit movement within meristems. The dCLCrV-tRNA cassette contains the 77 nts coding sequence for the pre-tRNAGly followed by the 23 nts sgRNA with Cas9 PAM sequence (5' NGG) and the 76 nts CRISPR scaffold; this cassette is repeated four times with unique sgRNAs (FIG. 8). Constructing the cassette is achieved through overlapping PCR and cloning with BsaI type IIS restriction endonuclease. In total, this cassette incorporates ~800 nts into the dCLCrV A genome which is within the molecular size that will not compromise viral DNA replication (Tuttle et al., 2008) and approximates the size of cDNAs introduced into this virus for gain-of-function analyses (McGarry and Ayre, 2012; McGarry et al., 2013; McGarry et al., 2016). In parallel, dCLCrV A with crRNA arrays targeting GhLOX1 and GhLOX5 for editing with Cas12a endonuclease will be created. Each dCLCrV A virus genome, in a binary vector (Tuttle et al., 2012), is introduced to *Agrobacterium tumefaciens.*

Virus Delivery of CRISPRs

Each dCLCrV virus, comprised of the A and B genomic components, is co-delivered with TRV:GhSP by Agro-infiltration to cotton seedlings following our standard procedures. We have a transgenic 35S:GFP:Cas9:NLS line (e.g., Cas9 with a nuclear localization signal and a GFP fusion, constitutively expressed from the CaMV 35S promoter) (Texas A&M; unpublished, but see (Janga et al., 2017)). As described above, 35S:Cas9 and 35S:Cas12a founder lines (FIG. 7A, B) will be generated, but the line has allowed us to proceed with initial experiments using dCLCrV-sgRNA (we will need Cas12a plants to test dCLCrV-crRNA constructs). As per standard VIGS experiments, inoculated plants are maintained in a growth chamber at 23° C. for 14 dpi and then moved to a greenhouse (23°-27° C., 16 h light/8 h dark photoperiod).

In another embodiment, another viral vector was designed for delivery of a GhSP silencing sequence and gene editing cassettes. It is a TRV viral vector that incorporates the GhSP silencing sequence and the promoter from Pea early browning virus to drive expression of a downstream target gene. Candidate target genes include GFP (green fluorescent protein) as a positive control and the tRNA-sgRNA cassettes for gene editing. It is illustrated in FIG. 9A-9B. Thus, the objective is similar to that described using dCLCrV above, but all components are included in a single virus. These will be tested along with TRV vectors constructed to include the Pea early browning virus promoter and downstream gene but without the GhSP silencing sequence. The vectors illustrated in FIGS. 9A-9B represent the molecule with GFP (FIG. 9A) or a tRNA-sgRNA cassette (FIG. 9B) for gene editing. These viral vectors will be introduced to cotton seedlings to test the approach.

Analyses of virus delivery and gene edits: At 28 dpi, plants will be analyzed for systemic viral infection. TRV: GhSP silencing will be clearly evident at 28 dpi with the formation of a terminal floral bud by the 5th node (McGarry et al., 2016). Systemic tissue will be harvested, DNA isolated by a CTAB procedure, and the presence and approximate titer of dCLCrV determined by PCR using primers specific for the dCLCrV Rep gene (McGarry and Ayre, 2012; McGarry et al., 2016). Evidence for gene-edited sectors, and the extent of sectoring (FIGS. 6A-6C) will be determined by amplicon sequencing. DNA will be isolated from developing leaves, mature leaves, bract leaves of flowers, floral organs, and seeds, and will be used to create PCR amplicons for sequencing and analysis by AGESeq (Jacobs et al., 2015; Xue and Tsai, 2015; Zhou et al., 2015).

If editing is very efficient, all four copies of each target gene may be edited in sectors of the M0 infected plant (e.g., edits in both A and D homeologs). If this is achieved, MgChl-edited plants will display bleached sectors. It is possible that WT alleles will remain, and edited sectors will be identified by amplicon sequencing. Flowers derived from edited sectors will be marked, and M1 seed collected for genotype and phenotype analysis. Plants will be selfed or crossed with other edited plants to achieve lineages with stable edits in the target genes. Analysis of oxylipin levels and challenges with cotton aphid and *Fusarium* will be conducted. Promising lines will be crossed with WT Jin668, Coker 312, or desired elite lines to segregate out the Cas9 or Cas12a transgene and achieve transgene-free plants.

CONCLUSION

The approach and methods described in these examples identifies candidate genes to target for editing that will be quickly assessed using this robust VIGS strategy. Gene editing of confirmed targets using Cas9 and/or Cas12a endonucleases, coupled with accelerated embryogenesis, can facilitate generating new edited lines. This novel, meristem-based gene editing strategy has the potential to revolutionize cotton agriculture and other crops by by-passing tissue culture.

REFERENCES

Aichinger E, Kornet N, Friedrich T, Laux T. 2012. Plant Stem Cell Niches. *Annual Review of Plant Biology* 63(1): 615-636.

Bailey T L, Johnson J, Grant C E, Noble W S. 2015. The MEME Suite. *Nucl Acids Res* 43(W1): W39-W49.

Bommert P, Lunde C, Nardmann J, Vollbrecht E, Running M, Jackson D, Hake S, Werr W. 2005. thick tassel dwarf1 encodes a putative maize ortholog of the *Arabidopsis* CLAVATA1 leucine-rich repeat receptor-like kinase. *Development* 132(6): 1235-1245.

Bommert P, Nagasawa N S, Jackson D. 2013. Quantitative variation in maize kernel row number is controlled by the FASCIATED EAR2 locus. *Nature Genetics* 45(3): 334-337.

Brand U, Fletcher J C, Hobe M, Meyerowitz E M, Simon R. 2000. Dependence of stem cell fate in *Arabidopsis* an a feedback loop regulated by CLV3 activity. *Science* 289 (5479): 617-619.

Burch-Smith T M, Schiff M, Liu Y, Dinesh-Kumar S P. 2006. Efficient Virus-Induced Gene Silencing in *Arabidopsis. Plant Physiol.* 142(1): 21-27.

Chen W, Yao J, Chu L, Yuan Z, Li Y, Zhang Y. 2015. Genetic mapping of the nulliplex-branch gene (gb_nb1) in cotton using next-generation sequencing. *Theoretical and Applied Genetics* 128(3): 539-547.

Chen W, Yao J, Li Y, Zhao L, Liu J, Guo Y, Wang J, Yuan L, Liu Z, Lu Y, et al. 2019. Nulliplex-branch, a TERMINAL FLOWER 1 ortholog, controls plant growth habit in cotton. *Theoret Appl Genet* 132(1): 97-112.

Chen Z J, Sreedasyam A, Ando A, Song Q, De Santiago L M, Hulse-Kemp A M, Ding M, Ye W, Kirkbride R C, Jenkins J, et al. 2020. Genomic diversifications of five *Gossypium* allopolyploid species and their impact on cotton improvement. *Nat Genet* 52(5): 525-533.

Chu Y-H, Jang J-C, Huang Z, van der Knaap E. 2019. Tomato locule number and fruit size controlled by natural alleles of Ic and fas. *Plant Direct* 3(7): e00142.

Chuang C-F, Running M P, Williams R W, Meyerowitz E M. 1999. The PERIANTHIA gene encodes a bZIP protein involved in the determination of floral organ number in *Arabidopsis thaliana. Genes & Development* 13(3): 334-344.

Clark S E, Running M P, Meyerowitz E M. 1995. CLAVATA3 IS A SPECIFIC REGULATOR OF SHOOT AND FLORAL MERISTEM DEVELOPMENT AFFECTING THE SAME PROCESSES AS CLAVATA1. *Development* 121(7): 2057-2067.

Clark S E, Williams R W, Meyerowitz E M. 1997. The CLAVATA1 gene encodes a putative receptor kinase that controls shoot and floral meristem size in *Arabidopsis*. *Cell* 89(4): 575-585.

Cong B, Barrero L S, Tanksley S D. 2008. Regulatory change in YABBY-like transcription factor led to evolution of extreme fruit size during tomato domestication. *Nature Genetics* 40(6): 800-804.

Dunlavy H. 1921. Frequency and Importance of Five-lock Bolls in Cotton. *Journal of the American Society of Agronomy* 13(8): 332-334.

Edgar R C. 2004. MUSCLE: multiple sequence alignment with high accuracy and high throughput. *Nucl Acids Res* 32(5): 1792-1797.

Fan C, Wu Y, Yang Q, Yang Y, Meng Q, Zhang K, Li J, Wang J, Zhou Y. 2014. A Novel Single-Nucleotide Mutation in a CLAVATA3 Gene Homolog Controls a Multilocular Silique Trait in *Brassica rapa* L. *Molecular Plant* 7(12): 1788-1792.

Fernandez-Pozo N, Rosli Hernan Â G, Martin Gregory Ā B, Mueller Lukas Â A. 2015. The SGN VIGS tool: User-friendly software to design virus-induced gene silencing (VIGS) constructs for functional genomics. *Molecular Plant* 8(3): 486-488.

Fletcher J C. 2020. Recent advances in *Arabidopsis* CLE peptide signaling. *Trends Plant Sci* 25(10): 1005-1016.

Fletcher J C, Brand U, Running M P, Simon R, Meyerowitz E M. 1999. Signaling of cell fate decisions by CLAVATA3 in *Arabidopsis* shoot meristems. *Science* 283(5409): 1911-1914.

Fletcher L C, Brand U, Running M P, Simon R, Meyerowitz E M. 1999. Signaling of cell fate decisions by CLAVATA3 in *Arabidopsis* shoot meristems. *Science* 283(5409): 1911-1914.

Gao X Q, Wheeler T, Li Z H, Kenerley C M, He P, Shan L B. 2011. Silencing GhNDR1 and GhMKK2 compromises cotton resistance to *Verticillium* wilt. *Plant J* 66(2): 293-305.

Goff S, Vaughn M, McKay S, Lyons E, Stapleton A, Gessler D, Matasci N, Wang L, Hanlon M, Lenards A, et al. 2011. The iPlant Collaborative: Cyberinfrastructure for Plant Biology. *Frontiers in plant science* 2.

Goodstein D M, Shu S, Howson R, Neupane R, Hayes R D, Fazo J, Mitros T, Dirks W, Hellsten U, Putnam N, et al. 2011. Phytozome: a comparative platform for green plant genomics. *Nucl Acids Res* 40(D1): D1178-D1186.

Je B I, Gruel J, Lee Y K, Bommert P, Arevalo E D, Eveland A L, Wu Q, Goldshmidt A, Meeley R, Bartlett M, et al. 2016. Signaling from maize organ primordia via FASCIATED EAR3 regulates stem cell proliferation and yield traits. *Nature Genetics* 48(7): 785-+.

Jones D S, John A, VanDerMolen K R, Nimchuk Z L. 2021. CLAVATA signaling ensures reproductive development in plants across thermal environments. *Curr Biol* 31(1): 220-227.e225.

Kumar S, Stecher G, Li M, Knyaz C, Tamura K. 2018. MEGA X: Molecular evolutionary genetics analysis across computing platforms. *Mol Biol Evol* 35(6): 1547-1549.

Laux T, Mayer K F X, Berger J, Jurgens G. 1996. The WUSCHEL gene is required for shoot and floral meristem integrity in *Arabidopsis*. *Development* 122(1): 87-96.

Liu L, Gallagher J, Arevalo E D, Chen R, Skopelitis T, Wu Q, Bartlett M, Jackson D. 2021. Enhancing grain-yield-related traits by CRISPR-Cas9 promoter editing of maize CLE genes. *Nature Plants* 7(3): 287-294.

Liu X, Kim Y J, Müller R, Yumul R E, Liu C, Pan Y, Cao X, Goodrich J, Chen X. 2011. AGAMOUS terminates floral stem cell maintenance in *Arabidopsis* by directly repressing WUSCHEL through recruitment of Polycomb Group proteins. *Plant Cell* 23(10): 3654-3670.

Mayer K F X, Schoof H, Haecker A, Lenhard M, Jurgens G, Laux T. 1998. Role of WUSCHEL in regulating stem cell fate in the *Arabidopsis* shoot meristem. *Cell* 95(6): 805-815.

McGarry R, Rao X, Li Q, van der Knaap E, Ayre B. 2020. SINGLE FLOWER TRUSS and SELF-PRUNING signal developmental and metabolic networks to guide cotton architectures. *J Exp Bot* 71(19): DOI: 10.1093/jxb/eraa1338.

McGarry R C, Ayre B G. 2012. Geminivirus-mediated delivery of florigen promotes determinate growth in aerial organs and uncouples flowering from photoperiod in cotton. *PLoS One* 7(5): e36746.

McGarry R C, Ayre B G. 2021. Cotton architecture: examining the roles of SINGLE FLOWER TRUSS and SELF-PRUNING in regulating growth habits of a woody perennial crop. *Curr Opin Plant Biol* 59: 101968.

McGarry R C, Prewitt S F, Culpepper S, Eshed Y, Lifschitz E, Ayre B G. 2016. Monopodial and sympodial branching architecture in cotton is differentially regulated by the *Gossypium hirsutum* SINGLE FLOWER TRUSS and SELF-PRUNING orthologs. *New Phytol* 212: 244-258.

Munos S, Ranc N, Botton E, Berard A, Rolland S, Duffe P, Carretero Y, Le Paslier M-C, Delalande C, Bouzayen M, et al. 2011. Increase in tomato locule number is controlled by two single-nucleotide polymorphisms located near WUSCHEL. *Plant Physiology* 156(4): 2244-2254.

Pautler M, Eveland A L, LaRue T, Yang F, Weeks R, Lunde C, Je B I, Meeley R, Komatsu M, Vollbrecht E, et al. 2015. FASCIATED EAR4 encodes a bZIP transcription factor that regulates shoot meristem size in maize. *Plant Cell* 27(1): 104-120.

Prewitt S F, Ayre B G, McGarry R C. 2018. Cotton CENTRORADIALIS/TERMINAL FLOWER 1/SELF-PRUNING genes functionally diverged to differentially impact plant architecture. *Journal of Experimental Botany* 69(22): 5403-5417.

Qu J, Ye J, Geng Y F, Sun Y W, Gao S Q, Zhang B P, Chen W, Chua N H. 2012. Dissecting Functions of KATANIN and WRINKLED1 in Cotton Fiber Development by Virus-Induced Gene Silencing. *Plant Physiology* 160(2): 738-748.

Rodríguez-Leal D, Lemmon Z H, Man J, Bartlett M E, Lippman Z B. 2017. Engineering quantitative trait variation for crop improvement by genome editing. *Cell* 171 (2): 470-480.e478.

Rodríguez-Leal D, Xu C, Kwon C-T, Soyars C, Demesa-Arevalo E, Man J, Liu L, Lemmon Z H, Jones D S, Van Eck J, et al. 2019. Evolution of buffering in a genetic circuit controlling plant stem cell proliferation. *Nat Genet* 51(5): 786-792.

Rodriguez G R, Munos S, Anderson C, Sim S-C, Michel A, Causse M, Gardener B B M, Francis D, van der Knaap E. 2011. Distribution of SUN, OVATE, L C, and FAS in the Tomato Germplasm and the Relationship to Fruit Shape Diversity. *Plant Physiology* 156(1): 275-285.

Running M P, Meyerowitz E M. 1996. Mutations in the PERIANTHIA gene of *Arabidopsis* specifically alter floral organ number and initiation pattern. *Development* 122(4): 1261-1269.

Schlegel J, Denay G, Wink R, Pinto K G, Stahl Y, Schmid J, Blümke P, Simon R G W. 2021. Control of *Arabidopsis* shoot stem cell homeostasis by two antagonistic CLE peptide signalling pathways. *eLife* 10: e70934.

Schoof H, Lenhard M, Haecker A, Mayer K F X, Jurgens G, Laux T. 2000. The stem cell population of *Arabidopsis* shoot meristems is maintained by a regulatory loop between the CLAVATA and WUSCHEL genes. *Cell* 100 (6): 635-644.

Senthil-Kumar M, Mysore K S. 2011. Virus-induced gene silencing can persist for more than 2 years and also be transmitted to progeny seedlings in *Nicotiana benthamiana* and tomato. *Plant Biotech J* 9(7): 797-806.

Sharma V K, Ramirez J, Fletcher J C. 2003. The *Arabidopsis* CLV3-like (CLE) genes are expressed in diverse tissues and encode secreted proteins. *Plant Mol Biol* 51(3): 415-425.

Si Z, Liu H, Zhu J, Chen J, Wang Q, Fang L, Gao F, Tian Y, Chen Y, Chang L, et al. 2018. Mutation of SELF-PRUNING homologs in cotton promotes short-branching plant architecture. *J Exp Bot* 69(10): 2543-2553.

Somssich M, Je B I I, Simon R, Jackson D. 2016. CLAVATA-WUSCHEL signaling in the shoot meristem. *Development* 143(18): 3238-3248.

Strabala T J, O'Donnell P J, Smit A-M, Ampomah-Dwamena C, Martin E J, Netzler N, Nieuwenhuizen N J, Quinn B D, Foote H C C, Hudson K R. 2006. Gain-of-function phenotypes of many CLAVATA3/ESR genes, including four new family members, correlate with tandem variations in the conserved CLAVATA3/ESR domain. *Plant Physiol* 140(4): 1331-1344.

Taguchi-Shiobara F, Yuan Z, Hake S, Jackson D. 2001. The fasciated ear2 gene encodes a leucine-rich repeat receptor-like protein that regulates shoot meristem proliferation in maize. *Genes Dev* 15(20): 2755-2766.

Tal L, Friedlander G, Gilboa N S, Unger T, Gilad S, Eshed Y. 2017. Coordination of Meristem Doming and the Floral Transition by Late Termination, a Kelch Repeat Protein. *Plant Cell* 29(4): 681-696.

Trapnell C, Williams B A, Pertea G, Mortazavi A, Kwan G, van Baren M J, Salzberg S L, Wold B J, Pachter L. 2010. Transcript assembly and quantification by RNA-Seq reveals unannotated transcripts and isoform switching during cell differentiation. *Nature Biotechnology* 28(5): 511-U174.

Tuttle J R, Haigler C H, Robertson D. 2012. Method: low-cost delivery of the cotton leaf crumple virus-induced gene silencing system. *Plant Methods* 8: 27.

Tuttle J R, Idris A M, Brown J K, Haigler C H, Robertson D. 2008. Geminivirus-mediated gene silencing from Cotton leaf crumple virus is enhanced by low temperature in cotton. *Plant Physiol* 148(1): 41-50.

Wan C-Y, Wilkins T A. 1994. A modified hot borate method significantly enhances the yield of high-quality RNA from cotton (*Gossypium hirsutum* L.). *Analytical Biochemistry* 223(1): 7-12.

Wan K, Lu K, Gao M, Zhao T, He Y, Yang D-L, Tao X, Xiong G, Guan X. 2021. Functional analysis of the cotton CLE polypeptide signaling gene family in plant growth and development. *Scientific Reports* 11(1): 5060.

Wang X, Aguirre L, Rodríguez-Leal D, Hendelman A, Benoit M, Lippman Z B. 2021. Dissecting cis-regulatory control of quantitative trait variation in a plant stem cell circuit. *Nature Plants* 7(4): 419-427.

Wu H, Qu X, Dong Z, Luo L, Shao C, Forner J, Lohmann J U, Su M, Xu M, Liu X, et al. 2020. WUSCHEL triggers innate antiviral immunity in plant stem cells. *Science* 370(6513): 227-231.

Xu C, Liberatore K L, MacAlister C A, Huang Z, Chu Y H, Jiang K, Brooks C, Ogawa-Ohnishi M, Xiong G, Pauly M, et al. 2015. A cascade of arabinosyltransferases controls shoot meristem size in tomato. *Nat Genet* 47(7): 784-792.

Yang Y, Zhu K, Li H, Han S, Meng Q, Khan S U, Fan C, Xie K, Zhou Y. 2018. Precise editing of CLAVATA genes in *Brassica napus* L. regulates multilocular silique development. *Plant Biotech J* 16(7): 1322-1335.

Yu J, Jung S, Cheng C-H, Lee T, Zheng P, Buble K, Crabb J, Humann J, Hough H, Jones D, et al. 2021. CottonGen: the community database for cotton genomics, genetics, and breeding research. *Plants* 10(12): 2805.

Zhang F, Wang Y, Irish V F. 2021. CENTRORADIALIS maintains shoot meristem indeterminacy by antagonizing THORN IDENTITY1 in *Citrus*. *Curr Biol* 31(10): 2237-2242.e2234.

```
SEQUENCES:
GhSP coding sequence from cotton, Gossypium
hirsutum (entire coding sequence was used in
TRV:GhSP silencing construct described in
Examples)
                                    SEQ ID NO: 1
5'-ATGGCAAAACTGTCAGATCCTCTTGTGTTGGGGAGAGTGATTGGGGA

TGTTATTGATGCCCTCTCCCCATCTGTGAAAATGTCAGTCACTTTCAACA

CCAACAAGCAGGTATATAATGGCCATGAATTTTTTCCATCTGCAGTTACT

AACAAGCCTAAGGTTGAGGTTCATGGAGGTGATATGAGATCCTTTTTCAC

CCTGGTGATGACAGACCCAGATGTTCCTGGTCCTAGTGACCCTTACCTGA

GGGAGCACTTACACTGGATAGTGACAGATATCCCCGGCACAACAGATGCC

ACATTTGGAAGGGAAATGGTGAACTACGAAATGCCAAGGCCAAACATAGG

GATCCACAGGTTTGTGTTCCTCCTCTTCAAGCAGAAAGGCAGGCAAACAG

TGAGAAGCATACCGTCATCAAGGGATCGTTTCTATACCAGGAAGTTTGCA

GAAGAAAACGAACTAGGGGTTCCTGTTGCAGCTGTCTATTTCAATGCTCA

AAGGGAAACAGCTGCTAGAAGACGCTAA-3'

GhSP protein sequence from cotton Gossypium
hirsutum
                                    SEQ ID NO: 2
MAKLSDPLVLGRVIGDVIDALSPSVKMSVTFNTNKQVYNGHEFFPSAVTN

KPKVEVHGGDMRSFFTLVMTDPDVPGPSDPYLREHLHWIVTDIPGTTDAT

FGREMVNYEMPRPNIGIHRFVFLLFKQKGRQTVRSIPSSRDRFYTRKFAE

ENELGVPVAAVYFNAQRETAARRR*

13 amino acid CLE box from AtCLV3 protein from
Arabidopsis
                                    SEQ ID NO: 3
LRTVPSGPDPLHH 13 amino acid CLE box from SlCLV3 protein from
Tomato
                                    SEQ ID NO: 4
LRGVPAGPDPLHH forward primer for Kbox VIGS targeting sequences
in cotton
                                    SEQ ID NO: 5
TCCAAATCTAGAGAGCTGTTGTTTGCTGAAATAGAG reverse primer for Kbox VIGS targeting sequences
in cotton
                                    SEQ ID NO: 6
CTCGTGCTCGAGGAGCTCGACTAGTTGAAGAACTATCTGGTCTTGC forward primer for MADS VIGS targeting sequences
in cotton
                                    SEQ ID NO: 7
CTCGTGTCTAGAATGGTGTACCCCAACGAATCCCTTG reverse primer for MADS VIGS targeting sequences
in cotton
                                    SEQ ID NO: 8
CTCGTGCTCGAGGAGCTCTGGAGAAGACAATCAAAGCAACCTC
```

We claim at least the following:

1. A method of producing a genetically modified plant, the method comprising:
   silencing a meristem maintenance gene in the plant to induce a phase change in the plant meristem from an indeterminate to a determinate state; and
   genetically manipulating a second gene in the plant;
   wherein genetic manipulation of the second gene in combination with silencing the meristem maintenance gene results in a detectable new phenotype in the genetically modified plant;
   wherein the new phenotype is distinguishable from a phenotype resulting from either silencing the meristem maintenance gene only or mutation of the meristem gene only;
   wherein the plant is a cotton plant;
   wherein the meristem maintenance gene is SELF-PRUNING (GhSP) from cotton having at least 99% identity to SEQ ID NO: 1;
   wherein the second gene is a cotton gene selected from the group consisting of: CLAVATA-WUSCHEL circuit, CLAVATA1, CLAVATA2, CLAVATA3, AGAMOUS (GhAG) from cotton, FASCIATED INFLORESCENCE (FIN), PERIANTHIA, AGAMOUS, and orthologs of the foregoing;
   wherein the silencing the meristem maintenance gene is by virus induced gene silencing (VIGS) using a suitable region of SEQ ID NO:1;
   wherein the silencing a meristem maintenance gene and the second gene are co-delivered; and
   wherein the genetically manipulating a second gene is by:
   (a) co-silencing the second gene with the meristem maintenance gene;
   (b) editing the second gene with delivery of RNA molecules and/or RNA-based signals;
   (c) modifying the second gene with a CRISPR/Cas gene editing system comprising a Cas nuclease and one or more CRISPR RNA guide sequences targeting the second gene; or
   (d) virus induced gene silencing (VIGS).

2. The method of claim 1, wherein silencing the meristem maintenance gene results in a greater percentage of the second gene in the plant as compared to genetic manipulation of the second gene without silencing the meristem maintenance gene.

3. The method of claim 1, wherein the RNA molecules and/or RNA-based signals are selected from guide RNA sequences for CRISPR-mediated gene editing, aptamers, ribozymes, and riboswitches.

4. The method of claim 3, wherein the one or more CRISPR RNA guide sequences targeting the second gene and the Cas nuclease are delivered to plant cells with one or more viral vectors.

5. The method of claim 1, wherein the VIGS comprises infecting the plant with a viral vector comprising an siRNA targeting a gene to be silenced.

6. The method of claim 1, further comprising identifying genetically modified plants or plant sections with the new phenotype indicating the presence of modified genes and collecting seeds from the plants.

7. A genetically modified plant comprising:
   a first engineered genetic modification comprising a silenced meristem maintenance gene, wherein the meristem maintenance gene modulates phase change in the plant meristem from an indeterminate to a determinate state such that silencing the meristem maintenance gene induces a phase change in the plant meristem from an indeterminate to a determinate state; and
   a second engineered genetic modification comprising a mutation of a second gene, wherein the genetically modified plant has a phenotype distinguishable from a corresponding wild type plant, a corresponding plant with only the first engineered genetic modification and a corresponding plant with only the second engineered genetic modification;
   wherein the plant is a cotton plant;
   wherein the meristem maintenance gene is SELF-PRUNING (GhSP) protein from cotton encoded by a nucleotide sequence having at least 99% identity to SEQ ID NO: 1;
   wherein the second gene is selected from the group consisting of: CLAVATA-WUSCHEL circuit, CLAVATA1, CLAVATA2, CLAVATA3, AGAMOUS (GhAG) from cotton, FASCIATED INFLORESCENCE (FIN), PERIANTHIA, AGAMOUS, and orthologs of the foregoing; and
   wherein the silenced meristem maintenance gene was silenced by virus induced gene silencing (VIGS).

8. The genetically modified plant of claim 7, wherein the mutation of the second gene is selected from: silencing, deletion of all or a portion of a polynucleotide sequence of the second gene, modification of a portion of a polynucleotide sequence of the second gene, and replacement of the second gene with an exogenous gene.

9. The genetically modified plant of claim 7, wherein the plant is cotton and wherein the second gene is a second meristem gene selected from the group consisting of: CLAVATA-WUSCHEL and AGAMOUS (GhAG).

10. A seed produced by the genetically modified plant of claim 7.

11. A kit for modifying meristem genes in a plant, the kit comprising:
    instructions for the kit; and
    a viral vector comprising:
    (a) an siRNA targeting a meristem maintenance gene that modulates phase change in a plant meristem from an indeterminate to a determinate state, such that the siRNA silences the meristem maintenance gene; and
    (b) one or more engineered RNA sequences, RNA-based signals, or a combination thereof, configured to modify a second gene in a plant;
    wherein the plant is a cotton plant;
    wherein the meristem maintenance gene is SELF-PRUNING (GhSP) from cotton having at least 99% SEQ ID NO: 1;
    wherein the siRNA targeting a meristem maintenance gene is based on a portion of SEQ ID NO: 1; and
    wherein the viral vector comprising the siRNA targeting a meristem maintenance gene and the one or more engineered RNA sequences, RNA-based signals, or a combination thereof to modify a second gene is delivered in a single virus.

* * * * *

SEQUENCE LISTING

<160> NUMBER OF SEQ ID NOS: 8

<210> SEQ ID NO 1
<211> LENGTH: 525
<212> TYPE: DNA
<213> ORGANISM: Artificial Sequence
<220> FEATURE:
<223> OTHER INFORMATION: Coding sequence for GhSP from cotton Gossypium hirsutum

<400> SEQUENCE: 1

```
atggcaaaac tgtcagatcc tcttgtgttg gggagagtga ttggggatgt tattgatgcc      60
ctctccccat ctgtgaaaat gtcagtcact ttcaacacca acaagcaggt atataatggc    120
catgaatttt ttccatctgc agttactaac aagcctaagg ttgaggttca tggaggtgat    180
atgagatcct ttttcacccct ggtgatgaca gacccagatg ttcctggtcc tagtgaccct    240
tacctgaggg agcacttaca ctggatagtg acagatatcc ccggcacaac agatgccaca    300
tttggaaggg aaatggtgaa ctacgaaatg ccaaggccaa acatagggat ccacaggttt    360
gtgttcctcc tcttcaagca gaaaggcagg caaacagtga gaagcatacc gtcatcaagg    420
gatcgtttct ataccaggaa gtttgcagaa gaaaacgaac taggggttcc tgttgcagct    480
gtctatttca atgctcaaag ggaaacagct gctagaagac gctaa                    525
```

<210> SEQ ID NO 2
<211> LENGTH: 174
<212> TYPE: PRT
<213> ORGANISM: Gossypium hirsutum

<400> SEQUENCE: 2

```
Met Ala Lys Leu Ser Asp Pro Leu Val Leu Gly Arg Val Ile Gly Asp
1               5                   10                  15

Val Ile Asp Ala Leu Ser Pro Ser Val Lys Met Ser Thr Phe Asn
            20                  25                  30

Thr Asn Lys Gln Val Tyr Asn Gly His Glu Phe Phe Pro Ser Ala Val
        35                  40                  45

Thr Asn Lys Pro Lys Val Glu Val His Gly Gly Asp Met Arg Ser Phe
    50                  55                  60

Phe Thr Leu Val Met Thr Asp Pro Asp Val Pro Gly Pro Ser Asp Pro
65                  70                  75                  80

Tyr Leu Arg Glu His Leu His Trp Ile Val Thr Asp Ile Pro Gly Thr
                85                  90                  95

Thr Asp Ala Thr Phe Gly Arg Glu Met Val Asn Tyr Glu Met Pro Arg
            100                 105                 110

Pro Asn Ile Gly Ile His Arg Phe Val Phe Leu Leu Phe Lys Gln Lys
        115                 120                 125

Gly Arg Gln Thr Val Arg Ser Ile Pro Ser Ser Arg Asp Arg Phe Tyr
    130                 135                 140

Thr Arg Lys Phe Ala Glu Glu Asn Glu Leu Gly Val Pro Val Ala Ala
145                 150                 155                 160

Val Tyr Phe Asn Ala Gln Arg Glu Thr Ala Ala Arg Arg Arg
                165                 170
```

<210> SEQ ID NO 3
<211> LENGTH: 13
<212> TYPE: PRT
<213> ORGANISM: Artificial Sequence
<220> FEATURE:
<223> OTHER INFORMATION: 13 amino acid CLE box sequence from AtCLV protein from Arabidopsis

<400> SEQUENCE: 3

Leu Arg Thr Val Pro Ser Gly Pro Asp Pro Leu His His
1               5                   10

<210> SEQ ID NO 4
<211> LENGTH: 13
<212> TYPE: PRT
<213> ORGANISM: Artificial Sequence
<220> FEATURE:
<223> OTHER INFORMATION: 13 amino acid CLE box sequence from SlCLV3
      protein from Tomato

<400> SEQUENCE: 4

Leu Arg Gly Val Pro Ala Gly Pro Asp Pro Leu His His
1               5                   10

<210> SEQ ID NO 5
<211> LENGTH: 36
<212> TYPE: DNA
<213> ORGANISM: Artificial Sequence
<220> FEATURE:
<223> OTHER INFORMATION: forward primer for Kbox VIGS targeting
      sequences in cotton

<400> SEQUENCE: 5
tccaaatcta gagagctgtt gtttgctgaa atagag                                 36

<210> SEQ ID NO 6
<211> LENGTH: 46
<212> TYPE: DNA
<213> ORGANISM: Artificial Sequence
<220> FEATURE:
<223> OTHER INFORMATION: reverse primer for Kbox VIGS targeting
      sequences in cotton

<400> SEQUENCE: 6
ctcgtgctcg aggagctcga ctagttgaag aactatctgg tcttgc                      46

<210> SEQ ID NO 7
<211> LENGTH: 37
<212> TYPE: DNA
<213> ORGANISM: Artificial Sequence
<220> FEATURE:
<223> OTHER INFORMATION: forward primer for MADS VIGS targeting
      sequences in cotton

<400> SEQUENCE: 7
ctcgtgtcta gaatggtgta ccccaacgaa tcccttg                                37

<210> SEQ ID NO 8
<211> LENGTH: 43
<212> TYPE: DNA
<213> ORGANISM: Artificial Sequence
<220> FEATURE:
<223> OTHER INFORMATION: reverse primer for MADS VIGS targeting
      sequences in cotton

<400> SEQUENCE: 8
ctcgtgctcg aggagctctg gagaagacaa tcaaagcaac ctc                         43